(12) United States Patent
Rogan et al.

(10) Patent No.: US 11,501,545 B2
(45) Date of Patent: *Nov. 15, 2022

(54) SMART MICROSCOPE SYSTEM FOR RADIATION BIODOSIMETRY

(71) Applicants: Peter Keith Rogan, London (CA); Yanxin Li, Kitchener (CA); Jin Liu, London (CA)

(72) Inventors: Peter Keith Rogan, London (CA); Yanxin Li, Kitchener (CA); Jin Liu, London (CA)

(73) Assignee: CytoGnomix Inc., London (CA)

( * ) Notice: Subject to any disclaimer, the term of this patent is extended or adjusted under 35 U.S.C. 154(b) by 177 days.

This patent is subject to a terminal disclaimer.

(21) Appl. No.: 17/137,317

(22) Filed: Dec. 29, 2020

(65) Prior Publication Data

US 2021/0124904 A1 Apr. 29, 2021

Related U.S. Application Data

(63) Continuation of application No. 16/057,710, filed on Aug. 7, 2018, now Pat. No. 10,929,641.

(51) Int. Cl.
*G06V 20/69* (2022.01)
*G06T 5/50* (2006.01)
(Continued)

(52) U.S. Cl.
CPC .............. *G06V 20/698* (2022.01); *G01T 1/02* (2013.01); *G06T 5/001* (2013.01); *G06T 5/50* (2013.01);
(Continued)

(58) Field of Classification Search
USPC .................................. 382/128–129, 133–134
See application file for complete search history.

(56) References Cited

U.S. PATENT DOCUMENTS 7,787,681 B2 8/2010 Zhang
7,822,249 B2 10/2010 Garty
(Continued)

OTHER PUBLICATIONS

Liu, Accurate Cytogenetic biododosimetry through automated dicentric chromosome curation and metaphase cell selection, 2017, Published online, 2017, Aug. 9, 2017 doi.: 10.12688/f1000research.1226.1, OMCID:PMC5583746, PMID:29026552, pp. 1-23. (Year: 2017).*

(Continued)

*Primary Examiner* — Ishrat I Sherali
(74) *Attorney, Agent, or Firm* — Ingenium Patents LLC

(57) ABSTRACT

Automation of microscopic pathological diagnosis relies on digital image quality, which, in turn, affects the rates of false positive and negative cellular objects designated as abnormalities. Cytogenetic biodosimetry is a genotoxic assay that detects dicentric chromosomes (DCs) arising from exposure to ionizing radiation. The frequency of DCs is related to radiation dose received, so the inferred radiation dose depends on the accuracy of DC detection. To improve this accuracy, image segmentation methods are used to rank high quality cytogenetic images and eliminate suboptimal metaphase cell data in a sample based on novel quality measures. When sufficient numbers of high quality images are found, the microscope system is directed to terminate metaphase image collection for a sample. The International Atomic Energy Agency recommends at least 500 images be used to estimate radiation dose, however often many more images are collected in order to select the metaphase cells with good morphology for analysis. Improvements in DC recognition increase the accuracy of dose estimates, by reducing false positive (FP) DC detection. A set of chromosome morphology segmentation methods selectively filtered out false DCs, arising primarily from extended prometaphase chromosomes, sister chromatid separation and chromosome frag-
(Continued)

mentation. This reduced FPs by 55% and was highly specific to the abnormal structures (≥97.7%). Additional procedures were then developed to fully automate image review, resulting in 6 image-level filters that, when combined, selectively remove images with consistently unparsable or incorrectly segmented chromosome morphologies. Overall, these filters can eliminate half of the FPs detected by manual image review. Optimal image selection and FP DCs are minimized by combining multiple feature based segmentation filters and a novel image sorting procedure based on the known distribution of chromosome lengths. Consequently, the average dose estimation error was reduced from 0.4 Gy to <0.2 Gy with minimal manual review required. Automated image selection with these filters reduces the number of images that are required to capture metaphase cells, thus decreasing the number of images and time required for each sample. A microscope system integrates image selection procedures controls with an automated digitally controlled microscope then determines at what point a sufficient number of metaphase cell images have been acquired to accurately determine radiation dose, which then terminates data collection by the microscope. These image filtering approaches constitute a reliable and scalable solution that results in more accurate and rapid radiation dose estimates.

17 Claims, 10 Drawing Sheets

(51) Int. Cl.
G01T 1/02 (2006.01)
G06T 5/00 (2006.01)
(52) U.S. Cl.
CPC .......... *G06V 20/693* (2022.01); *G06V 20/695* (2022.01); *G06T 2207/10056* (2013.01); *G06T 2207/20224* (2013.01)

(56) References Cited

U.S. PATENT DOCUMENTS

| 7,826,977 | B2 | 11/2010 | Garty |
| 7,898,673 | B2 | 3/2011 | Randers-Pehrson |
| 8,605,981 | B2* | 12/2013 | Rogan .................. C12Q 1/6883 382/133 |
| 10,929,641 | B2* | 2/2021 | Rogan .................. G06V 10/421 |
| 10,991,098 | B1* | 4/2021 | Hänselmann ........... G06T 7/155 |

OTHER PUBLICATIONS

Shen et al. A dicentric chromosome identification method based on clustering and watershed algorithm, Published online Feb. 19, 2019, doi: 10.1038/s41598-019-38614-7, PMCID: PMC8381119, PMID: 30783206, pp. 1-9 (Year: 2019).*
Rogan PK et al. (2016) Radiation Dose Estimation by Automated Cytogenetic Biodosimetry, Radiation Protection Dosimetry 172, 207-217.
MATLAB (R2014a), Mathworks, Natick, MA.
Rieder C and Palazzo R (1992) Colcemid and the mitotic cycle, Journal of cell science 102 ( Pt 3), 387-392.
Sethakulvichai, W., et al (2012) Estimation of band level resolutions of human chromosome images, International Joint Conf. Comp Science and Software Engineering, pp. 276-282.
Carothers, A., and Piper, J. (1994) Computer-aided classification of human chromosomes: a review, Statistics and Computing 4, 161-171.
International Standing Committee on Human Cytogenetic Nomenclature, Shaffer et al . . . (2013) ISCN 2013: An International System for Human Cytogenetic Nomenclature (2013), Karger.
Schunck C et al. (2004) New developments in automated cytogenetic imaging: unattended scoring of dicentric chromosomes, micronuclei . . . Cytogenet. Genome Res. 104, 383-389.
Shirley et al. (2020) Estimating partial-body ionizing radiation exposure by automated cytogenetic biodosimetry. Int J. Rad Biol 96:1492-1503.
Blakely W et al. (2005) Early-response biological dosimetry—recommended countermeasure enhancements for mass-casualty radiological incidents . . . Health physics 89, 494-504.
Wilkins R et al. (2008) Interlaboratory comparison of the dicentric chromosome assay for radiation biodosimetry in mass casualty events. Radiation Research 169, 551-560.
Bauchinger M (1984)Cytogenetic effects in human lymphocytes as a dosimetry system. In: Eisert WS, Mendelsohn ML ed. Biological dosimetry: . . . Springer-Verlag; 15-24.
Lloyd DC et al. (1986) Chromosome aberrations induced in human lymphocytes by in vitro acute X and Gamma radiation. Rad. Prot. Biodosimetry. 15:83-88.
International Atomic Energy Agency (IAEA). Cytogenetic analysis for radiation dose assessment. Technical Report Series No. 405, Vienna (2001).
International Atomic Energy Agency (IAEA). Cytogenetic Dosimetry: Applications in Preparedness for and Response to Radiation Emergencies, Vienna (2011).
Ainsbury EA et al. (2009) Interlaboratory variation in scoring dicentric chromosomes in a case of partial-body x-ray exposure: implications for . . . Radiat. Res. 172: 746-752.
Lloyd DC et al. (2000) The role of cytogenetics in early triage of radiation casualties. Appl. Radiat. Isot. 52:1107-1112.
Flegal F et al. (2010) Quickscan dicentric chromosome analysis for radiation biodosimetry. Health Phys. 98: 276-281.
Vaurijoux A et al. (2009) Strategy for population triage based on dicentric analysis. Radiat Res 171:541-548.
Vaurijoux A et al. (2015) Automatic Dicentric Scoring a Real Option to Be Used in Biological Dosimetry. Radiation Emergency Medicine. 4:16-21.
Gruel G et al. (2013) Biological Dosimetry by Automated Dicentric Scoring in a Simulated Emergency. Radiation Res. 179: 557-569.
Wang Z et al. (2004) Image quality assessment: from error visibility to structural similarity, IEEE Transactions on Image Processing 13, 600-612.
Nill NB and Bouzas B (1992) Objective image quality measure derived from digital image power spectra, OPTICE 31, 813-825.
Narwaria M and Lin W (2010) Objective Image Quality Assessment Based on Support Vector Regression, IEEE Transactions on Neural Networks 21, 515-519.
Li Y et al. (2016) Automated discrimination of dicentric and monocentric chromosomes by machine learning-based image processing, Microscopy Research and Technique 79, 383-402.
Arachchige AS et al (2010) An image processing algorithm for accurate extraction of the centerline from human metaphase . . . IEEE Int. Conf Image Processing pp. 3613-3616.
Arachchige AS et al.(2013) Intensity integrated Laplacian-based thickness measurement for detecting human metaphase chromosome centromere . . . IEEE Trans.Biomed Eng.60: 2005-13.
Subasinghe A et al. (2016) Centromere Detection of Human Metaphase Chromosome Images using a Candidate Based Method, F1000Research 5, 1565, 2016.
Arachchige AS et al (2012) Intensity integrated Laplacian algorithm for human metaphase chromosome centromere detection, IEEE Can Conf. Electrical & Computer Engineering pp. 1-4.

* cited by examiner (A) Selection model generation wizard: (entities in red lines are proposed new classes)

(B) Selection model generation dialog:

(C) Presentation of selection generation results (red lines), in relation with existing Wizard classes:

SMART MICROSCOPE SYSTEM FOR RADIATION BIODOSIMETRY

RELATED APPLICATION

This application claims priority of U.S. Non-Provisional application Ser. No. 16/057,710 filed on Aug. 7, 2018, the content of which is hereby incorporated into this application by reference.

BACKGROUND

The analysis of microscopy images of cells is the basis of several types of analysis of the effects of damage by ionizing radiation. The gold standard radiation biodosimetry method, the dicentric chromosome assay (DCA), involves measuring the frequency of aberrant dicentric chromosomes in a patient sample. While some aspects of the assay have been successfully automated and streamlined, its overall throughput remains limited by the labour-intensive manual dicentric (DC) scoring step, potentially affecting timely estimation of radiation exposures of multiple affected individuals, for example, in a radiation accident or a mass casualty event (Blakely et al. 2005; Wilkins et al. 2008).

Biodosimetry is a useful tool for assessing the dose received by an individual when no reliable physical dosimetry is available. Traditionally, the dicentric chromosome assay is the method of choice for recent acute exposures to ionizing radiation. This cytogenetic method is based on measuring the frequency of dicentric chromosomes (DCs) in metaphase cells and converting this frequency to dose using in vitro generated calibration curves (Bauchinger et al. 1984; Lloyd et al. 1986; IAEA 2001). Classical, microscope analysis of DCs is robust, allowing the estimation of doses in the range of 0.1 to 5 Gy. For dose estimates in the low end of this range, however, 1000 cells are typically scored (IAEA 2011) making this method time consuming and only feasible for small numbers of exposures. This manual approach lacks adequate throughput for a mass casualty event to estimate the radiation exposures needed to triage for diagnosis and treatment.

Other cytogenetic assays and systems have been described for measuring absorbed radiation. These systems are distinct from the DCA and suffer from several disadvantages. DCs are among the most stable biological markers of radiation exposure and can be detected up to 3 months post exposure. The micronucleus assay, by contrast, can be performed up to 7 days after exposure. The H2AX assay, which measures DNA damage, can be used up to 72 hr after radiation. Also, the DCA can be performed using Giemsa stained chromosomes, which contrasts with other assays requiring fluorescence in situ hybridization to identify chromosomes or elements of chromosomes. The DCA is considerably faster, less expensive, and involves less complex laboratory procedures than other cytogenetic techniques, since fluorescent reagents and wash steps following their application are not required. Fluorescent techniques based on cytogenetic microscopy include identification chromosome rearrangements based on translocations with chromosome painting probes, or to mark chromosomes with centromere and telomere probes. The RABiT system automates fluorescent-based biodosimetry assays which do not depend on metaphase chromosome image analysis (U.S. Pat. No. 7,787,681B2, U.S. Pat. No. 7,822,249B2, U.S. Pat. No. 7,826,977B2, U.S. Pat. No. 7,898,673B2). The system can either count H2AX protein foci detected by fluorescently labeled antibodies or can use fluorescent probes or stains to identify and count binucleated micronuclei in microscopy images. While these steps are automated, RABiT does not however determine when sufficient numbers of dicentric chromosomes or cells of adequate quality have been identified, nor does it determine the level of exposure in Gy based on a calibration curve. The RABiT microscope system does not automate manage sample acquisition for radiation biodosimetry in the same manner that the instant invention performs these tasks.

In response to the pressing demand to increase throughput in cytogenetic biodosimetry, capture of metaphase images and interpretation of DCs have been partially automated, with a concomitant reduction in the numbers of cell analyzed. Software (eg. MSearch, DCScore [Metasystems]) has automated the scanning of microscope slides to locate metaphase cells and assisted review of DCs for triage biodosimetry (Schunck et al. 2004). This software has also facilitated inter-laboratory collaboration and the assessment of partial-body exposures (Ainsbury et al. 2009). The adoption of triage scoring of 50 carefully selected cells greatly increases the throughput, while maintaining the ability to identify exposures of over 1 Gy (Lloyd et al. 2000), and reducing the time required by more than a factor of 5 (Flegal et al. 2010).

More recently, automated image analysis software that can identify DCs (DCScore™, Metasystems) has been used for biodosimetry (Vaurijoux et al. 2009; Vaurijoux et al. 2015). However, it is still necessary to manually pre-process and supervise DC analyses performed with this software. After cells with abnormal chromosome counts and according to Metasystems, "metaphases where the two chromatids are sticked or with twisted chromosomes, and metaphases where centromeric constrictions are not visible" are removed, the remaining images are analyzed with the software (Gruel et al. 2013). The operator then excludes images with "twisted chromosomes, two aligned chromosomes, and other figures detected as dicentrics by the software." False positive (FP) DCs will alter the estimated dose if these steps are not performed (Gruel et al. 2013). DCScore™ software is therefore considered semi-automated because it requires manual pre- and post-processing review of DCs (Schunck et al. 2004; Vaurijoux et al. 2015), especially at low radiation doses.

The high rate of FPs in raw data is not surprising considering the known variation among chromosome morphologies. The detection of DCs, which are much less frequent than monocentric chromosomes (MCs), is also impacted by differences in sample processing procedures among laboratories (Wilkins et al. 2008).

One challenging issue with automated analysis is the selection of images of adequate quality for accurate identification of the chromosome damage. Selection of images for cytogenetic biodosimetry has traditionally requires a subjective, manual review of images to determine those of sufficient quality to score DCs unequivocally. The decision to manually select or exclude microscope images for DCA has not been based on analyses of quantitative analysis of structural properties in each chromosome, metaphase cell, or the level of contamination with non-chromosomal objects; without attention to this image properties, automated cell image capture approaches make this approach impractical due to the growing size of datasets of many samples consisting of thousands of images. Image quality assessment often estimates new data in relation to reference images (Zhou et al. 2004), complex mathematical models (Nill and Bouzas 1992), or distortions from a training set recognized by machine learning (Narwaria and Lin 2010). Generic methods of assessing image quality are not appropriate in our situation. Features tailored for ranking chromosome images cannot be generalized to entropy measures based on applying frequency filter to intensity distributions. To be useful, quality assurance for evaluation of specific microscopic biological objects in an image may require expert-derived rules to categorize preferred images. When performed manually, the speed of this process can vary significantly between samples, and the accuracy may reflect subjective evaluation between experts or may not be reproducible with the same expert.

Improved methods were sought that uniformly, reproducibly, and automatically evaluate the suitability of metaphase images, since these improves the accuracy of dose estimation. Furthermore, implementation of this automated process provides feedback control of the microscope system that enables samples to complete processing once the system indicates that a sufficient number of high quality metaphase images have been ascertained.

SUMMARY

The methods, systems, and platforms of the present disclosure provide means for automatically controlling a microscope system for determining exposure levels to ionizing radiation using the DCA. This smart microscopy system processes images of metaphases chromosomes and classifies DCs, if any, in each image. Then, the system selects those images with the most accurate identifications of DCs, and determines radiation exposure levels in biological samples by comparison of system-generated radiation dose calibration curves derived from the DCA. When a sufficient number of high quality images have been ascertained from a sample for dose estimation, the digitally-controlled microscope system terminates acquisition of additional images by the microscope system, thus expediting both data collection and interpretation. This is an improvement over conventional digitally controlled microscopy systems for cytogenetic biodosimetry analysis, since the instant invention reduces the amount of time required to obtain sample data while at the same time, ensures that cytogenetic biodosimetry images meet the quality requirements for the assay.

Disclosed herein is an imaging platform comprising: (a) a microscope system capable of recognizing and digitally imaging metaphase chromosomes, and (b) a processor configured to perform image analysis, wherein the image analysis comprises: the Automated Dicentric Chromosome Identifier (ADCI) software to automate DC scoring and radiation dose estimation. The algorithms underlying ADCI have been described and experimentally validated (Li et al. 2016; Arachchige et al. 2010; Arachchige et al. 2012; Arachchige et al. 2013; Subasinghe et al. 2016). Briefly, foreground objects are extracted from the metaphase cell image by thresholding intensities above background levels using a gradient vector flow method. Preprocessing filters remove most (but not all) non-chromosomal objects (e.g. debris, nuclei, overlapping chromosomes). Each remaining object is regarded as a single, intact, post-replication "chromosome" object. These can include objects that DCScore rejects as possible DCs, specifically those chromosomes with separated sister chromatids, where the individual chromatids are in close proximity to one another and are tethered to the same centromere and are therefore recognized as synapsed. In ADCI, each chromosome is processed to determine a contour (chromosome boundary) and its centerline (chromosome long axis) by discrete curve evolution. The Intensity-Integrated Laplacian method (Arachchige et al. 2013; Subasinghe et al. 2016; U.S. Pat. No. 8,605,981) constructs a width profile from consecutive vector field tracelines running approximately orthogonal to the centerline, and potential centromere locations ("centromere candidates") are identified from constrictions in the said width profile (see FIG. 1). Machine learning (ML) modules use image segmentation features derived from each chromosome to classify centromeres and dicentric chromosomes (Li et al. 2016; Rogan et al. 2016). The first Support Vector Machine (SVM) ranks potential centromere candidates in each chromosome according to their corresponding hyperplane distances; then another SVM scores the chromosome as either monocentric (MC) or dicentric (DC) using features derived from the top two candidates.

Samples exposed to known radiation doses (in Gy) are processed by ADCI to construct a dose-response calibration curve. The average frequency of DC's per cell in dose calibrated samples, the radiation response, is fit to a linear-quadratic function. The response for test samples exposed to unknown radiation levels can then be analyzed with this equation to estimate their corresponding doses.

We noticed that metaphase cell images of inconsistent quality can affect accuracy of dose estimation by ADCI. Previous studies evaluated the efficacy of ADCI at chromosome classification and dose estimation[10,11]. While the sensitivity (recall) for DCs was acceptable (~70%) and relatively constant at all radiation exposure levels, precision showed a strong dependence on dose. Chromosome misclassification, in particular false positive dicentrics (FPs) were more prevalent at low (≤1 Gy) compared to high (3-4 Gy) doses; at 1 Gy, FPs could outnumber true positive dicentrics (TPs) by a factor of 4 to 5. Consequently, ADCI-processed samples exhibited a reduced range of accurate responses to radiation compared to manually scored samples. Although use of the same algorithm to derive the calibration curve compensates for some of these differences, reliability of dose estimation ultimately hinges on DC classification accuracy. As DCs are greatly outnumbered by MCs (background frequency in normal, unexposed individuals is one DC per 1000 cells), this study focuses on improving the distinction between TP and FP DCs without compromising recall.

FPs reflect inadequacies in misinterpreting certain chromosome morphologies or non-chromosomal objects. Selective targeting and removal of these instances would reduce FPs without limiting TP identification, improving overall classification accuracy. We investigated FP morphologies to identify problematic cases and devised a set of post-processing object segmentation filters to eliminate them. Then, to ensure consistent performance, segmentation filters were developed to remove poor quality cell images. These images are usually characterized by either a lack of or incomplete complement of metaphase chromosomes, misclassified interphase or micro-nuclei as metaphases, or incorrectly segmented sister chromatids as individual chromosomes. Each proposed filter was tested individually, and the best performing filters were integrated, and tested on actual cytogenetic dosimetry data exposed to various radiation doses. The effects of these filters on classification performance was evaluated on image sets from two independent biodosimetry laboratories, and their impact on dose estimation was assessed on cells obtained from an international biodosimetry exercise.

We present this hybrid approach which selects images based on a combination of optimal global image properties for scoring metaphase cells, and customized object segmentation, identification and elimination of false positive DCs.

Automated image selection with these segmentation filters reduces the number of images that are required to capture metaphase cells, thus decreasing the number of images and time required to process each sample. For example, ADCI rejects approximately 30% of all high magnification metaphase images produced natively by Metafer (Metasystems) software in which the default classifier is used to detect metaphase cells. Since 90% of the time used to capture images per sample are detected during this step of metaphase finding, the time required for instant invention to capture all the requisite images in a sample will be 27% less than if the system had not been used. A microscope system integrates image selection procedures by electronically sending instructions to an automated digitally controlled microscope to discontinue collecting images after it determines that sufficient number of high quality metaphase cell images have been acquired to detect DCs accurately. The novel aspect of this software is that the microscope system will accurately determine radiation dose from these images, while terminating data collection sooner than it would have been normally programmed to end this process. These improvements in the ADCI-controlled microscope system ensure timely, reproducible, and accurate quantitative assessment of acute radiation exposure.

In some embodiments of the disclosed digitally controlled microscope system with a motorized stage to move between cells, motorized turret to change optical objectives, executable software performs segmentation of chromosome objects in microscope images, determines image quality and counts the number images of sufficient quality for cytogenetic analysis, then determines whether chromosome objects are either monocentric, dicentric chromosomes or neither of these objects, and counts the number of DCs in each image, then determines whether the number of images and dicentric chromosomes fulfill criteria published by the IAEA (2011) for performing the DC assay. If these criteria met, the system determines the frequency of DCs over all images from the same individual, estimates the exposure to radiation based on this frequency.

In some embodiments of the disclosed microscope system with a digital camera, a digital processor configured to perform executable instructions that analyze images of cells produced by said camera, and instruct the microscope system to continue or terminate the collection of images, which the microscope system then performs. Upon termination the data collection and processing of this sample, the aforementioned process is repeated for the next sample, if any.

In some embodiments disclosed digitally controlled microscope system, executable software processes chromosome objects present in the images generated by the microscope system, and once all of the chromosome objects from the same sample are processed, the system calculates the radiation exposure (in Gy) of a sample based on the DC frequency in a set of metaphase images from a sample, including either whole body or partial body exposures. In some embodiments, executable software also calculates a confidence interval for the dose of radiation exposure.

DETAILED DESCRIPTION OF THE INVENTION

Cytogenetic data were obtained by biodosimetry laboratories at Health Canada (HC) and Canadian Nuclear Laboratories (CNL) according to IAEA guidelines. Blood samples were irradiated by an XRAD-320 (Precision X-ray, North Branford, Conn.) at Health Canada and processed at both laboratories. Peripheral blood lymphocyte samples were cultured, fixed, and stained at each facility according to established protocols (Wilkins et al. 2008; IAEA 2011). Metaphase images from Giemsa-stained slides were captured independently by each lab using an automated microscopy system (Metasystems). One set of metaphase images from CNL and two sets from HC (Table 1) were used for development and initial testing of the proposed algorithms.

After image processing by ADCI, called DCs were manually reviewed and the consensus scores of TPs or FPs by 3 trained individuals were determined. Calibration curves were prepared based on 6 samples of known radiation dose (Table 2). An additional 6 samples[11] were initially blinded to the actual radiation exposures as test samples (Table 3). Test samples were exposed to a range of radiation doses bounded by the doses of samples used to construct the calibration curve. The sample naming convention is the lab name followed by the sample identifier, e.g. HC1 Gy signifies the 1 Gy calibration sample prepared at HC, whereas CNL-INTC03S04 represents the INTC03S04 international exercise test sample (exposed to 1.8 Gy) prepared at CNL.

Data consisted either of all "metaphase" images captured by the microscopy system, or a manually curated set of 500 high quality images. Selection of raw metaphase images for inclusion in samples was done automatically at HC using the default image classifier of the Metafer slide scanning system, while CNL selected images manually according to IAEA guidelines. Experts from CNL selected for images deemed analyzable by humans with respect to chromosome count, spatial distribution and morphology.

1) ADCI Settings & Metaphase Image Data

ADCI software (V1.0) was used for DC detection and dose prediction, with the MC-DC SVM tuning parameter, $\sigma$, set to 1.5. ADCI libraries were initially written in MATLAB (R2014a) to develop and test the proposed DC FP filters, and were subsequently rewritten in C++ and integrated into ADCI. For development and validation of segmentation filters, independent datasets used three sets of roughly 200 images each (2 low dose, 1 high dose) were prepared from larger image sets that were originally used for validation of previous versions of ADCI (see Table 1; HC-mixed image set).

2) Morphological Characterization of FPs

Figure 1:
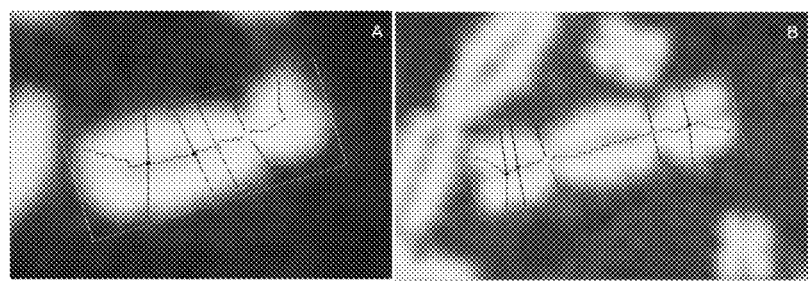
FIG. 1. Chromosome images processed by ADCI, annotated with key segmentation features. (A) Monocentric and (B) Dicentric chromosome. Chromosome contour is overlaid in green, long-axis centreline in red. Yellow and cyan markers on the centerline indicate the top-ranked and $2^{nd}$-ranked centromere candidate, respectively (other candidates not shown), with their corresponding width tracelines (roughly orthogonal to centerline) displayed in the same colour. Arc lengths of width tracelines running down the centerline (not all shown) are used to construct a chromosomal width profile. Note that the top-ranked candidate correctly labels the true centromere location, while the $2^{nd}$-ranked candidate labels a minor non-centromeric constriction. By comparing features extracted from both candidates (including width and pixel intensity information), the software correctly assessed that only one of the candidates is an actual centromere, so the chromosome was classified as monocentric. In dicentric chromosomes, both candidates would label actual centromeres.
Figure 2:
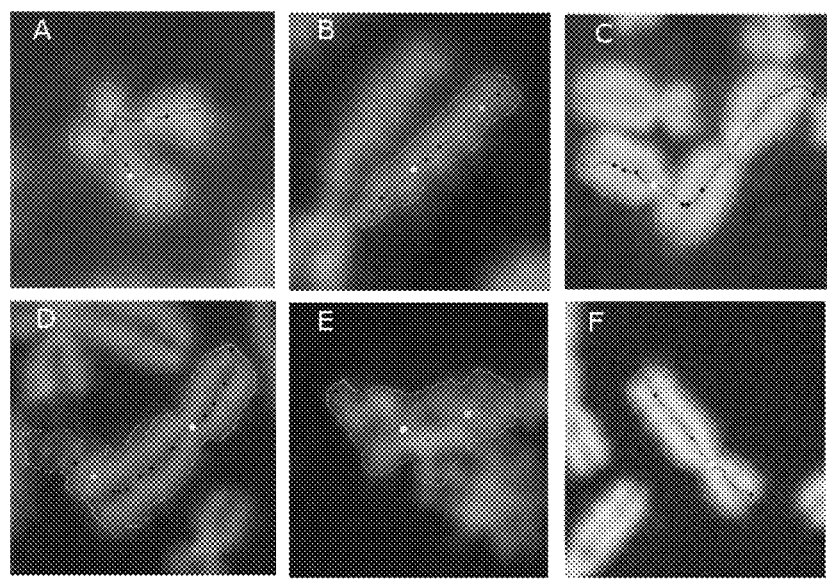
FIG. 2. Examples of FPs in each morphological subclass. The subclasses are defined in the Methods 2. Chromosome contours are displayed in green, centerlines in red, top-ranked and $2^{nd}$-ranked centromere candidates in yellow and cyan, respectively, and other centromere candidates in blue. (A) SCS: An MC with SCS showing the characteristic localization of centerline along chromatid. (B) Chromosome fragment: Artifactual fragmentation of a chromosome caused by overaggressive image segmentation. (c) Chromosome overlap: Two touching MCs treated as a single DC (under-segmentation). (D) Noisy contour: The jagged contour due to poor image contrast is prone to introducing artifactual width constrictions. (E) Cellular debris: Incorrectly processed as a chromosome. (F) ML deficiency: An MC with no notable errors in contour or centerline.

FPs and TPs were compared according to their respective segmentation features, including contour, width profile, centerline placement, centromere candidate placement, and total pixel area (Table 1). FPs were grouped by common distinguishing traits and assigned to one or more of the following morphological classes:

I. Sister chromatid separation:
   Sister chromatid separation (SCS) of a chromosome refers to the loss of sister chromatid cohesion at the telomeres, and often along the sister chromatids, excluding the centromeres. Due to inherent limitations of a centerline derived from contour skeletonization in chromosomes, SCS often resulted in partial or complete localization of the centerline along a single chromatid, rather than along the long axis of the full-width chromosome (Arachchige et al. 2012; Arachchige et al. 2013; Subasinghe et al. 2016). Complete centerline localization to chromatids of the q arm was common among acrocentric chromosomes (see FIG. 2A). This resulted in a width profile in which the displaced centerline did not accurately represent the width of the chromosome, and compromised centromere determination.

II. Chromosome fragmentation:
   Sister chromatid pairs were completely dissociated in metaphase images, resulting in incorrect labeling of each chromatid as separate chromosomes. Occasionally, segmentation fragmented images of intact non-uniform chromosomes into multiple, chromosomal artifacts[6] (see FIG. 2B). Artifactual fragmentation into incomplete chromosome fragments led to unpredictable results, increasing FPs and FNs.

III. Chromosome overlap:
   Poor spatial separation of chromosomes produced clusters of overlapping/touching chromosome clusters which were inseparable. Occasionally, the cluster is segmented as a single contiguous object (see FIG. 2C). Like chromosome fragments, analysis of these overlapping chromosome clusters produces erroneous results. FP DCs were produced from clusters comprising two underlying monocentric chromosomes, each contributing a centromere to the combined object.

IV. Noisy contour:
   Poor image contrast at the chromosomal boundary produced "noisy," jagged chromosome contours contributing multiple small constrictions to the width profile (see FIG. 2D). These artifactual constrictions were incorrectly identified as multiple centromeres if their magnitudes were similar to the true centromere, leading to FP assignment.

V. Cellular debris:
   Non-chromosomal objects such as nuclei and cellular debris were generally removed by pre-processing based on thresholding relative size and pixel intensity. However, aggregated cellular debris were occasionally labelled as a chromosome and naively analyzed by the software (see FIG. 2E).

VI. Machine learning error:
   A "catch-all" subclass for MCs with no identifiable morphological traits and reasonable contours and centerlines (see FIG. 2F). These cases reflect deficiencies in the feature set or training data of the machine learning (ML) classifiers, rather than image segmentation errors.

3) Filtering Out False Positive Objects

Quantitative filters were created and tested to delineate FP DCs. Each formula targets one or more of the morphological classes described above, and generates a unitless filter score for each object, independent of the biodosimetry reference laboratory source. For any metaphase image, $\{c_1, \ldots, c_N\}$ denotes the set of N chromosomes within the image and $c^*$ denotes the predicted DC of interest. Each filter classifies $c^*$ as either a TP or FP by comparing its filter score against a heuristically-defined threshold that is independent of laboratory provenance. Thresholds were established empirically to maximize elimination of FPs without altering recognition of TPs. FPs generally produce lower filter scores than TPs (i.e. lower area, lower width, less oblong footprint, more asymmetrical), so FPs were selectively targeted by eliminating candidate DCs with scores below a threshold. Due to the low frequency of DCs in any given sample, minimizing the loss of TPs is paramount to minimize the likelihood of TP removal. For each filter, corresponding filter scores were calculated for all DCs in the HC-mixed image set (Table 1), and a heuristic threshold (to 2 significant digits; see below) was set to the minimum value observed in TPs. Thresholds for filters VI to VIII were calculated by repeating the same procedure on a chromosome set of 244 TPs from the MC-DC SVM training set, and the final thresholds were set to the lower of each pair of values.

Figure 3:
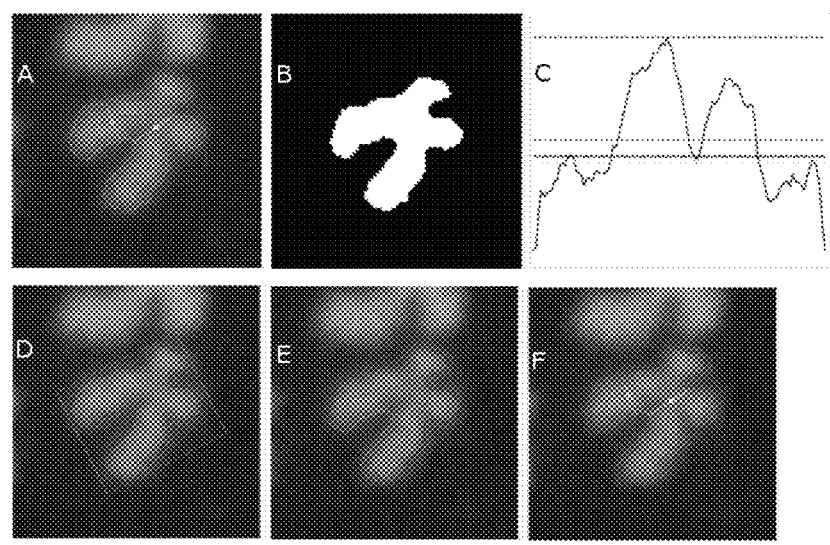
FIG. 3. A visualization of DC filter scores for a particular FP. DC Filters are defined in Methods 3.1. (A) A processed FP (acrocentric chromosome with SCS), with contour in green, centerline in red, top-ranked centromere candidate and its width traceline in yellow, $2^{nd}$-ranked centromere candidate and its width traceline in cyan. (B) Filter I: Thresholded binary image of the chromosome is used to calculate pixel area (in white). (c) Filters II-V: Width profile along centerline is shown in red (horizontal axis plots centerline location, vertical axis plots width), with mean width in green (filter II), median width in blue (filter III), max width in magenta (filter IV), and width of top centromere candidate in yellow (filter V). (D) Filter VI: Contour in blue and its minimum bounding rectangle in magenta and green. (E) Filter VII: Partitioning of contour at centerline endpoints (intersection of red line with contour) into two segments, green and blue. (F) Filter VIII: Traceline endpoints of top 2 centromere candidates (intersection of yellow and cyan lines with contour) are used to partition contour into 4 segments (1 blue, 1 green, 2 magenta); relative arc lengths of blue and green segments are taken into consideration.

I. Area filter:
   $A(c)$ denotes the pixel area occupied by chromosome c (see FIG. 3B). $c^*$ was classified as FP if $A(c^*)/\text{median}(\{A(c_1), \ldots, A(c_N)\}) < 0.74$ or as TP otherwise. This filter targets small acrocentric chromosomes (commonly displaying SCS) and chromosome fragments.

II. Mean width filter:
   $W_{mean}(c)$ denotes the value of the width profile of chromosome c (see FIG. 3C). $c^*$ was classified as FP if $W_{mean}(c^*)/\text{median}(\{W_{mean}(c_1), \ldots, W_{mean}(c_N)\}) < 0.80$ or as TP otherwise. This filter targets SCS and chromosome fragments.

III. Median width filter:
   $W_{med}(c)$ denote the median value of the width profile of chromosome c (see FIG. 3C). $c^*$ was classified as FP if $W_{med}(c^*)/\text{median}(\{W_{med}(c_1), \ldots, W_{med}(c_N)\}) < 0.77$ or as TP otherwise. This filter targets SCS and chromosome fragments.

IV. Max width filter:
   $W_{max}(c)$ denotes the maximum value of the width profile of chromosome c (see FIG. 3C). $c^*$ was classified as FP if $W_{max}(c^*)/\text{median}(\{W_{max}(c_1), \ldots, W_{max}(c_N)\}) < 0.83$ or as TP otherwise. This filter targets SCS and chromosome fragments.

V. Centromere width filter:
   $W_{cent}(c)$ denotes the width of chromosome c at the top-ranked centromere candidate (see FIG. 3C). $c^*$ was classified as FP if $W_{cent}(c^*)/\text{median}(\{W_{cent}(c_1), \ldots, W_{cent}(c_N)\}) < 0.72$ or as TP otherwise. This filter targets SCS and chromosome fragments.

VI. Oblongness filter:
   $S(c)$ denotes the pair of side lengths of the minimum bounding rectangle enclosing the contour of chromosome c (see FIG. 3D). $c^*$ was classified as FP if $1 - \min(S(c^*))/\max(S(c^*)) < 0.28$ or as TP otherwise. This filter targets acrocentric chromosomes with SCS and some cases of overlapping chromosomes.

VII. Contour symmetry filter:
   Let $L(c)$ denote the pair of arc lengths of contour halves produced by partitioning the contour of chromosome c at its centerline endpoints (see FIG. 3E). Classify $c^*$ as FP if $\min(L(c^*))/\max(L(c^*)) < 0.51$ or as TP otherwise. This filter targets SCS.

VIII. Intercandidate contour symmetry filter:
   $L_C(c)$ denotes the pair of arc lengths of the contour regions of chromosome c that run between the traceline endpoints of its top 2 centromere candidates (see FIG. 3F). $c^*$ was classified as FP if $\min(L_C(c^*))/\max(L_C(c^*)) < 0.42$ or as TP otherwise. This filter targets SCS and some cases of overlapping chromosomes.

Figure 4:
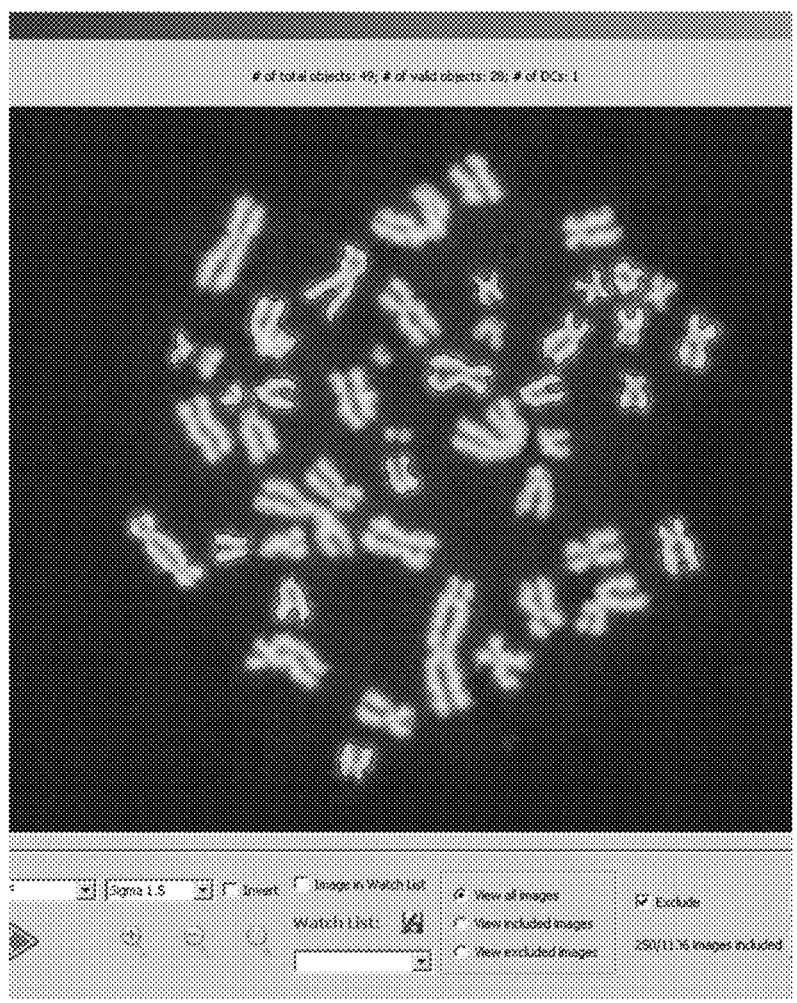
FIG. 4. Cell image viewer in ADCI demonstrating example of a corrected FP DC. Graphical User Interface for viewing cell images within a sample processed by ADCI[11]. Valid segmented objects (generally chromosomes, but occasionally nuclei or debris) are shown with coloured contours. Red contours indicate predicted DCs, yellow contours indicate chromosomes that were initially classified as DC but removed by the FP filters (new), green contours indicate predicted MCs, and blue contours indicate objects that could not be further processed after segmentation. Beneath the image, new controls were added to allow manual inclusion/ exclusion of images within a sample from dose analysis.

Incorporation into existing algorithms: After chromosome processing and MC-DC SVM classification[11] but prior to dose determination, all DC chromosomes inferred by ADCI were analyzed with the proposed DC filters. DC filter scores exceeding TP thresholds were included in the dose determination, whereas DCs classified as FPs by any filters (inclusive "or") were eliminated. DCs that were filtered out are outlined in yellow in the ADCI cell image viewer[11] (FIG. 4).

Determination of optimal filter subset: The proposed filters were not completely independent of each another, as some measures were related to the same chromosome segmentation features (i.e. width for filters II-V, contour symmetry for VII-VIII) and/or targeted the same morphological subclass (notably SCS). Thus, the "optimal" filter subset (termed "FP filters") was defined as the subset of filters which maximized FP removal ability while minimizing redundant FPs. Performance for a given set of filters was the total percentage of FPs removed by any of its filters (inclusive "or") in the HC-mixed image set (see Table 1). Using a forward selection approach, individual filters were added iteratively to identify those which produced the largest improvement in performance.

Evaluation of FP specificity on HC test samples: All objects removed by the FP filters in each image in HC samples INTC03S01, INTC03S08 and INTC03S10 (Table 3) were manually reviewed (FIG. 4). Filtered TPs and filtered objects with ambiguous classifications (TP or FP) were reviewed with another expert before final classification. For each sample, the number of filtered FPs was determined by subtracting number of filtered TPs from the total filtered count, and FP specificity was defined as the ratio of count of FPs to that of all filtered objects.

4) Dose Estimation Analysis

In ADCI, a pre-computed dose-response calibration curve is also used to estimate radiation absorbed in samples with unknown exposures[11]. For a given sample, ADCI calculates the mean response from total number of detected DCs divided by the number of cell-containing images. Calibration curves can be generated from a set of calibration samples either by processing and calculating a response for each sample, or allowing the user to input the corresponding response, and fitting the dose-response paired data to a linear-quadratic curve by regression. Because sample preparation protocols vary between laboratories, dose estimation of test samples were performed with calibration curves generated by the same source[11].

Distinct calibration curves were generated for each laboratory, either enabling or disabling FP filters, for the 0, 0.5, 1, 2, 3 and 4 Gy calibration samples (see Table 2). Radiation doses of images obtained by HC for test samples (Table 3) were estimated using the HC calibration curve derived by ADCI after applying the same FP filters. A similar analysis was carried out for the 5 CNL test samples using the CNL calibration curve data.

5) Effect of Filtering on Manually Image Selected HC Data

To investigate the impact of manual image selection on dose accuracy, we compared HC calibration curves derived from manually curated samples with the FP filters either enabled or disabled (Table 2). Manual curation of the HC samples was similar to manual image selection performed by CNL. Images were selected requiring: I) Complete complement of approximately 46 chromosomes, >40 segmented objects, <5 segmented objects from different nuclei if multiple nuclei present; II) Exclusion of "harlequin" chromosomes. Cells with unevenly stained sister chromatids cultured in the presence of bromodeoxyuridine (BrdU), which is indicative of $2^{nd}$ division metaphases, were excluded (Subasinghe et al. 2016); III) Well-spread, sharply-contrasted chromosomes with minimal sister chromatid dissociation. Only images with <5 incorrectly-segmented chromosomes were included, where incorrect segmentation was defined as chromosome overlaps (indicating poor spread), fragments (indicating sister chromatid dissociation) and overly-noisy contours (indicating poor image contrast); IV) Adequate chromatid condensation. Depending on the stage of metaphase arrest, the degree of chromosome condensation can differ (Rieder and Palazzo 1992; Sethakulvichai et al. 2012). Prometaphase cells have longer chromosomes, are less rigid, exhibit greater overlap and less well-defined centromere constrictions, all of which pose a significant challenge for automated chromosome classifiers (Sethakulvichae et al. 2012; Carothers and Piper 1994). Metaphase images with longer, thinner chromosomes (roughly corresponding to >500-band level) were also excluded. Guidelines I-III and a minimum sample size of 500 cells were adopted from IAEA recommendations, whereas guideline IV was added after preliminary inspection of HC calibration samples. Manual curation was performed within ADCI by retrospectively excluding images in processed samples from dose analysis (FIG. 4). For each sample, consecutive images meeting all criteria were evaluated until 500 images were accrued. DC classifications were hidden during image selection to minimize bias. After generation of the curated HC calibration curves, the radiation doses of the three HC test samples (Table 3) were re-estimated on the new curves, with and without the FP filters enabled.

6) Automating Removal of Suboptimal Images by Morphology Filtering

Reference biodosimetry laboratories screen for interpretable metaphase cell images prior to DC analysis. Manual selection of images assures consistency and reliability of metaphase data, which increases analytic accuracy. As automated DC analysis can also be affected by variable cell image quality, excluding undesirable images in a sample would be expected to reduce FPs, and expected to more accurately estimate radiation exposures.

Image segmentation filters used empirically determined criteria to eliminate metaphase cells with characteristics that increased FP DCs. Image-level segmentation filters that threshold features I and II (below) were used to detect cells in prometaphase (relatively long and thin chromosome morphology), prominent sister chromosome dissociation, and highly bent and twisted chromosomes; another filter (III) detected overly-smooth contours characterized by images containing intact nuclei and otherwise incomplete chromosome sets. The total object count (IV) and segmented object count filters (V) fulfill general criteria for nearly normal metaphase images of approximately 46 chromosomes. These filters are used to exclude images with extreme object counts. Filter VI selects images based on effectiveness of chromosome recognition by ADCI.

Image level filters I-III are calculated in terms of their z-scores of all objects in an image. For any particular metaphase image I* in a sample containing M images, where $\{I_1, \ldots, I_M\}$, $\{c_1, \ldots, c_N\}$ denote the set of N chromosomes within image I*. Additionally, SD denotes the standard deviation function, and T denotes the threshold SD common to all 3 filters that identifies outlier images. This SD value was set heuristically to 1.5 after by varying T after applying these filters to the HC 2 Gy calibration sample (Table 2). Similarly, suggested thresholds in filters IV-VI are also derived from experiences of testing multiple samples.

I. Length-width ratio filter (LW) defines the average length-width ratio of chromosomes in an image. For a given chromosome c in a given image I containing N chromosomes, L(c,I) denotes the arc length of the centerline of c, and $W_{mean}(c,I)$ denotes the mean value of the width profile of c. MW(I) is defined as mean$\{L(c_1,I)/W_{mean}(c_1,I), \ldots, L(c_N,I)/W_{mean}(c_N,I)\}$. I* is removed if MW(I*)>mean$\{MW(I_1), \ldots, MW(I_M)\}$+T×SD$\{MW(I_1), \ldots, MW(I_M)\}$.

II. Centromere candidate density filter (CD) counts occurrences of centromere candidates in chromosomes. It eliminates images containing chromosomes with a high density of centromere candidates. For a given chromosome c in image I containing N chromosomes, L(c,I) denotes the arc length of the centerline of c, and $N_{cent}(c,I)$ denotes the number of centromere candidates along c. CD(I) is defined as the mean$\{N_{cent}(c_1,I)/L(c_1,I), \ldots, N_{cent}(c_N,I)/L(c_N,I)\}$. I* is removed if CD(I*)>mean$\{CD(I_1), \ldots, CD(I_M)\}$+T×SD$\{CD(I_1), \ldots, CD(I_M)\}$.

III. Contour finite difference filter (FD) represents contour smoothness of chromosomes in an image. It eliminates images with prominent non-chromosomal objects with smooth contours, such as nuclei or micronuclei. For a given chromosome c in a given image I containing N chromosomes, $WP_D(c,I)$ denotes the set of first differences of the normalized width profile of c (range normalized to interval [0,1]). WD(I) is defined as the mean{mean{abs{$WP_D(c_1,I)$}}, . . . , mean{abs{$WP_D(c_N,I)$}}}. I* is removed if WD(I*)<mean{WD$(I_1)$, . . . , WD$(I_M)$}−T×SD{WD$(I_1)$, . . . , WD$(I_M)$}.

IV. Total object count (ObjCount) filter defines the number of all objects detected in an image. Values lying outside of a threshold range are rejected to eliminate images with multiple metaphases or excessive cellular debris. Based on empirical analyses, the suggested object count range falls within the interval [40, 60].

V. Segmented object count (SegObjCount) filter defines the number of objects processed by GVF algorithm in an image. It is applied in the same way as filter IV. The suggested range for the object count interval is [35, 50].

VI. Classified object ratio (ClassifiedRatio) filter defines the ratio of objects recognized as chromosomes to the total number of segmented objects. It prevents images in which ADCI fails to process most chromosomes from being included. An image is removed if the value is less than a threshold of either 0.6 or 0.7, which is determined by the desired level of stringency for application of this filter.

Combining filters. Applying these filters sequentially to the same image distinguished the metaphase images for dose estimation from less optimal cells with increased FPs. This was done by combining the Z-scores of the image filters in a linear expression of features I-VI that provides an assessment of image quality. The resultant total score represents the degree to which a particular image deviates from the population of images in a sample:

Score=w(LW)×z(LW)+w(CD)×z(CD)−w(FD)×z(FD)+
w(ObjCount)×|z(ObjCount)|+w(SegObjCount)×
|z(SegObjCount)|−w(ClassifiedRatio)×z(ClassifiedRatio)

Each feature has a positive free parameter, weight, to adjust its contribution to the total score. The term LW determines that longer and thinner chromosomes in the image will increase the score, as do bending and twisted chromosomes due to the term CD. Lower chromosome concavity also drives the score higher because of FD term. Object count and segmented object count describe chromosome positioning, separated sister chromatid level, etc. Assuming the majority of images in a sample are good images, these terms will result in higher scores for images exhibiting either incomplete, multiple cells or severe sister chromatid separation. The last terms produce high scores for images that the algorithm does not process accurately. Images with smaller combined score are of higher quality. The weights used are identified by evaluating many possible weights and selecting those that minimize the error in curve calibration. The weights obtained are optimal for calibration samples, which will perform well on test samples, subject to the condition that the calibration and test samples have comparable chromosome morphologies. The score, however, cannot be used for inter-sample image quality comparisons, as z-scores are normalized within a sample.

Another, more general method was also developed to assess metaphase images separately from other images in the same sample. Image morphology is the primary consideration in assessing metaphase image quality. The most common problems in poor quality metaphase cells are severe sister chromatid separation, excessive chromosome overlap, fragments of chromosomes in image segmentation, and multiple cells or incomplete cells in the same image. They result in changes in either the number of objects or areas of objects. For instance, chromatid separation and chromosome fragments cause more objects to be present in an image while areas of some objects are smaller than normal. Chromosome-overlaps reduce the number of objects, but their areas exceed those of discrete chromosomes.

To derive this novel quality measure, we exploited the general property that the different chromosome lengths are approximately proportionate to the known base-pair counts of each complete human chromosome. By comparing the distribution of observed chromosome object lengths with the gold standard derived from the lengths obtained from the human genome sequence, we can assess the overall quality chromosome segmentation of each cell. This assumption sets aside chromosome abnormalities which result from radiation exposure, which will be distributed randomly among cells analyzed, because the cells are synchronized and harvested after a single division. The actual chromosome lengths are difficult to measure accurately in images, so instead, individual chromosomes are approximated according to their corresponding chromosome areas (in pixels). Therefore, the area of an object in a metaphase image is used as a surrogate for which chromosome it represents. Once noisy non-chromosomal objects, nuclei and large overlapped chromosome clusters are removed, areas of the remaining objects are then calculated based on their fractions to the total area of all chromosomes, as overlapping chromosomes and chromatid separation do not significantly affect the total area of objects in each metaphase image. We bin the chromosomes in metaphase cell into three categories corresponding to the known cytogenetic classification system[16]: group A and B (AB), group C (c) and groups D, E, F, and G (DG). A chromosome in category AB contains more than 2.9% (determined by the shortest B group chromosome) of total base-pairs in the complete chromosome set. A chromosome in category C has less than 2.9% (determined by the longest C group chromosome) but more than 2% (determined by the shortest C group chromosome) of total base-pairs in the set. Any chromosome in category DC contains fewer than 2% (determined by the longest D group chromosome) of the total base-pairs. These thresholds 2.9% and 2% are acceptable for the X and Y chromosomes, respectively. We apply these thresholds to object areas to count the number of chromosomes in each category in a metaphase image. An ideal metaphase image will have 10 AB chromosomes, 16 C chromosomes and 20 DG chromosomes if the individual is female, or 10 AB chromosomes, 15 C chromosomes and 21 DG chromosomes if the individual is male. Images with chromosome overlap will tend to have increased AB chromosome counts, while images with sister chromatid separation will likely have elevated DG chromosome counts. The morphological quality of a metaphase image can be measured by comparing its chromosome categorizing result to the female/male standard. In practice, we treat the categorizing result of an image as a 3-element vector and calculate the Euclidean distance to the standard. A larger distance corresponds to a less satisfactory image, and we find that this measurement is universal for metaphase images from different samples.

When images in a sample are sorted, by either combined z-score or by chromosome group bin area measurement, a certain number of top ranked images can then be selected for dicentric chromosome analysis. Complex image selection models can be created by filtering images first with filters and then selecting a certain number of top scoring images.

7) Sample Quality Confidence Measurement

Metaphase image artifacts such as sister chromatid separation and chromosome fragmentation interfere with the ability to correctly identify dicentric chromosomes, and compromises the reliability of dose estimates. This dependence of dose estimation accuracy on sample image quality motivates objective tests to evaluate and flag data from lower quality samples and exclude such images from analysis. Samples exposed to low LET whole-body irradiation, typically seen in radiation incidents, exhibit DCs frequencies that follow a standard Poisson distribution (IAEA 2011) of DCs per cell. Deviation from the expected Poisson distribution can thus be attributed to failure to accurately recognize and account for DCs within the sample or by artifacts in the sample that are not eliminated by the software. Following this principle, we devised a sample quality evaluation method based on the conformity of the DC count frequency distribution in each sample to a theoretical Poisson distribution, as follows:

The number of DC occurrences in a cell is constructed as a probability model in a sample. It is a discrete statistical model as the number of events can only be integers. The appearance of any DC is assumed to be independent of other DCs that may form. The rate at which DCs occur is constant for a single sample at a given radiation dose for full-body irradiation. The model of DCs per cell detected by ADCI can therefore be approximated by a Poisson distribution. The Poisson $\lambda$ parameter is obtained from the average number of DCs per cell in a sample.

The observed DC distribution detected by ADCI is compared with the Poisson distribution using the Pearson chi-squared goodness-of-fit test. The test indicates the probability of observing the observed data under the null hypothesis that they are Poisson distributed. Samples without at least 1 cell image having >1 DC cannot be analyzed, due to insufficient degrees of freedom. A smaller p-value means the hypothesis is less likely and that the DC detection results for that sample are less reliable. Very low p-values at or below $\alpha=0.01$ (99% confidence level) reject the null hypothesis and indicate low quality samples.

Automated Determination of Optimal Image Selection Models

The foregoing describes methods of applying different image segmentation parameters that select a subset of high quality images collected by the microscopy system which provide improved accuracy in the estimates of radiation dose for a specific sample. This described process derived these parameters by empirical approaches. Automatic generation of optimal image selections for given samples in ADCI is preferable to users of the system because they may be more accurate than empirical methods, tailored to the specific samples and data quality available, and are less time consuming and labor-intensive. The automation image selection is a self-contained component in ADCI, including user interfaces and processing functions. The communication between ADCI and image selection automation are: (1) the main window in ADCIDE starts image selection automation; (2) the work space in ADCI sends opened processed samples to image selection automation; and (3) image selection automation may use plot output and/or console output to display results. Automatic generation of optimal image selection model will be referred as 'selection model generation' in forthcoming comments.

Selection model generation is unconditionally delivered as a component of the ADCI system, which means it is not an optional add-on element to ADCI. Selection model generation is triggered by an action in 'Wizards' menu in main window (Currently 'Curve Calibration' and 'Dose Estimation' are in the menu). Selection model generation includes a wizard to collect data and parameters, and a dialog to perform optimal image selection model generation. The Selection model generation wizard contains all pages found in the other wizards (egdose estimation, curve calibration) in ADCI, that is, the introduction and conclusion pages. Completing all of the wizard steps, prefills the selection model generation dialog. The Selection model generation wizard contains a page for users to select loaded previously processed samples and to specify the corresponding physical exposure values for samples of known radiation dose.

These samples are used to evaluate the accuracy of each possible selection model over the range of parameter values. The Selection model generation wizard provides a page for users to select a SVM sigma value (a measure that balances specificity and sensitivity for dicentric chromosome detection) of each of samples used to derived the model. The sigma value used applies to both the samples used to create the Selection model and those used to evaluate it. The Selection model generation wizard also has a page for users to specify parameters used to create the search space of all of the parameter combinations used to specify different possible Selection models. The search space of image selection models consists of combined z-score models (A_[CDE]) and group bin plus filtering models ([BCD]_[AB]). The number of selected images can also be varied, which is particularly useful for samples that contain images with poor morphology chromosomes or for models of high quality samples requiring fewer images, which would reduce the time that the system requires to processing a sample. The Selection model generation wizard contains a page for users to specify parameters for selection model evaluation. Three different methods for the evaluation of image selection models have been validated, including: 1) p-values of Poisson fit of dicentric chromosome distribution in every sample (ideal samples do not differ from a Poisson distribution, so $p>0.05$ is preferable); 2) calibration curve fit residual (requires at least 3 samples); and 3) leave-one cross-validation of dose estimation (requires at least 4 samples). The main dialog of selection model generation contains a panel shows a summary of collected data, parameters and info. A button on the screen is selected by the user to start generation and evaluation of the models. The main dialog of selection model generation indicates a progress bar which is incremented during the generation of all Selection models. Once all Selection models have been evaluated, the main dialog of Selection model generation presents a panel showing the results with the top 10 optimal selection models found during the search. Users may then directly save the optimal selection models as files so that they may be used in the future, eg. by applying them to new samples.

Microscope System Control

Once the ADCI software has determined that a sufficient number of high quality images have been identified and IEAA criteria have been met for cytogenetic biodosimetry (either >100 dicentric chromosomes or >500 cells), it can direct the microscopy system to discontinue image capture from that sample, then proceed to a new sample. This is a significant advantage over other microscopy systems, since the time per sample is minimized by avoiding collecting images that are unnecessary for the radiation dose determining. In a radiation mass casualty or nuclear accident in which multiple samples may need to be analyzed but the number of microscopy systems to process those samples is limited, the time savings from excluding unnecessary metaphase images can be more effectively utilized by increasing the throughput of sample processing.

ADCI has been integrated with an automated microscopy system for metaphase cell capture, Metafer (Metasystems Inc) to discontinue collecting further metaphase images from a sample. When sufficient numbers of high quality images have been obtained for radiation dose estimation on a slide from a sample, ADCI creates a file that is checked frequently by Metafer for one of 5 possible commands that can cancel steps, metaphase searches or resume metaphase searching on a slide. Alternatively, it can broadcast a message through Windows Message Broadcasting to the active Metafer window cancel a search for further metaphase cells on a microscope Metafer is configured to externally cancel a search for metaphase cells by the microscope system by checking the file ExtCancel.TXT in the path of the executable (C:\MetaSystems\Bin) within 1000 msec the ExtCancelInterval in the MFGeneral section of the Metafer.INI (the initialization/configuration) file on the microscopy system. The text file created by ADCI contains on the first line the command CancelSlide, which ends the metaphase search, and assuming that each slide contains cells from a different sample, the metaphase images on subsequent slide (corresponding to the next sample) will begin to be captured. This command triggers Alternatively, using Windows Message Broadcasting, the parameter "WMOnImgExpo" in MFGeneral of Metafer.INI is set to 1. The message is a comma delimited string containing the export format and the number of images that ADCI has determined should be exported. This number is fewer than the number of images that have collected by the automated metaphase finding Metafer (Metasystems) software.

Advantages of the Invention

Automated biodosimetric methods aimed at detecting DCs can produce incorrect assignments because the algorithms cannot capture the full range of morphological variability inherent in chromosome images of metaphase cells. Accuracy of radiation exposure estimates using automated biodosimetry can be improved by image segmentation and filtering methods that remove suboptimal metaphase cell images and eliminate false positive DCs. This study implements and tests a set of morphology-based filters to eliminate FP DCs and unsuitable metaphase images for automated biodosimetry. Compared to results generated by the previous version of ADCI[11], inclusion of these filters reduced FP DC rates by ~55% across a wide range of radiation exposure levels. Additionally, we showed that these filters were highly specific for FPs in test image sets as well as actual patient samples (97.7–100%, n=6). Overall, the FP filters substantially improve DC classification accuracy.

This is because proposed segmentation filters successfully target SCS and chromosome fragments. In particular, the intercandidate contour symmetry filter is a very promising SCS detector, individually eliminating 84% of all SCS-induced FPs in our test dataset. It was noted that acrocentric chromosomes were disproportionately susceptible to SCS-induced errors compared to other chromosome types (69% of SCS cases despite making up only 22% of human chromosomes). Given the rarity of acrocentric TP DCs (due to width profile inaccuracies at the extreme ends of chromosomes[7-9]), filters targeting acrocentric or small chromosomes, in general (such as filters I and VI), can also be useful for reducing SCS-induced FPs.

Certain FP subclasses were commonly targeted by multiple filters. Redundancy among the segmentation features resulted in only subset of the filters being required to maximize elimination of FPs. Notably, filters II-V eliminated FPs based different definitions of chromosome width. The final combination of FP filters consisted of only 5 of the 8 originally proposed; however, it should be noted that a combination of only the intercandidate contour symmetry and max width filters achieved nearly the same level of FP detection in the test sample dataset, with the other filters having incremental benefit.

Scale-invariance is an obligate property for any object-level filter, since chromosome structures may vary between cells, individuals, and laboratory preparations. Scale invariance is also necessary to control for pixel-based chromosome measurements affected by condensation differences over the course of metaphase and differences in optical magnification. This principle was achieved by either using filter scores normalized to the median "raw" score of all objects within the same cell image (i.e. filters I-V), or in which scores were derived from ratios of two pixel-based measurements (i.e. filters VI-VIII).

There were differences in accuracy between the manually and automatically-selected images for dose estimation. For the previously manually curated CNL and HC samples, the FP object filters respectively reduced the average dose estimation error from 0.4 Gy to <0.2 Gy (with a maximum error of 0.4 Gy). This placed the accuracy our software comfortably within the ±0.5 Gy requirement for triage purposes[17]. However, applying the FP object filters alone to unselected HC metaphase data did not improve accuracy (average error increased by 0.15 Gy). Thus, FP object filters alone did correct for inaccurate dose response estimates in all cases.

Variable cell image quality in some samples contributed to this source of error. Some unselected HC samples contained images with high levels of SCS, which upon processing produced large numbers incorrectly classified chromosome fragments. Image level filters I-V targeted these fragments, however they were not excluded based on their threshold values, because they comprised the predominant morphology within these particular cells. For similar reasons, object-level filtering was not suitable for elimination for removal of prometaphase images containing high resolution chromosomes (>800 band level). These observations suggested the need for image-level filters to select low quality images for removal in addition to the object-level filters.

Image quality is critical to the accurate DC detection. Manual inspection and quality control is common practice in cytogenetics and biodosimetry laboratories, but it is labor-intensive. Image-level filtering was automated to address this problem. These methods apply statistical thresholds to morphological features of chromosomes and non-chromosomal objects throughout a metaphase cell image. Image scoring methods select a defined number of top-ranked, processed images for dose estimation. The combined z-score method is a weighted sum of standard deviations below or above the mean score of objects in an image for each of the filter, and indicates relative image quality. The chromosome group bin method is a more general criterion that is calibrated to relative chromosome lengths (and area) in base pairs. ADCI evaluates the morphological deviation of chromosome area and ranks cell images relative to that expected from the standard, normal karyotype. These FP filtering and image scoring methods, which are referred to collectively as image selection models, can be applied either individually or in combinations within ADCI.

The significant improvement in accuracy of DC frequency is attributable to both FP elimination and image selection. Dose estimation errors with suitable image selection models in test samples consisting of at least 250 images are considerably reduced. The estimates are within the +/−0.5 Gy window of the corresponding physical doses for the majority of samples tested. The current image selection models in ADCI generally provide reliable image quality control without manual intervention.

Automated image selection aims to simulate manual image curation. Experiments demonstrated that the proposed methods successfully improve dose estimates in test samples. At this point, automation does not quite achieve the same overall accuracy, especially for samples of variable quality. The respective differences in dose estimates, especially at exposures >2 Gy, are not significant. Automating image selection using this smart microscopy system, nevertheless, offers unique advantages over manual image selection in terms of analytic uniformity and speed.

EXAMPLES

Example 1. Application of Chromosome Morphology Filters to Remove FPs

False positive DCs (n=97) from a low dose set metaphase images were classified to uniquely identify, and ultimately eliminate these objects. Chromosomal morphological subclasses (FIG. 3) included those exhibiting excessive sister chromatid separation (I, n=51), fragmentation (II, n=10), overlap (III, n=17), noisy contours (IV, n=5), cellular debris (V, n=4), and inaccurate recognition by the centromere candidate[10] and MC/DC[6] machine learning algorithms (VI, n=11).

Segmentation filtering criteria were applied to these images. Scale-invariant filters were tested to determine thresholds that selectively removed subclasses I-III without eliminating any TPs. Of the 51 SCS cases, 35 involved short, acrocentric chromosomes. FPs were distinguished from TPs based on either their lower relative pixel area or width (filters I-V), substantially non-oblong footprint (filter VI), or substantial contour asymmetry across the centerline (filters VII and VIII). For filters I-V, normalization to median scores of other objects in the same image performed similarly to normalization to other measures of central tendency (e.g. z-score, mean, and mode after binning scores). FPs were eliminated for each morphological subclass (Table 4), with most of the segmentation filters acting on the targeted subclass, however, the effects of each filter were not exclusive to those subclasses (Methods 3).

To evaluate individual filter performance, the percentage of FPs removed by each filter was calculated for the HC-mixed image set (Table 5). A two-sample Kolmogorov-Smirnov test (K-S) was also performed for each filter ($\alpha$=0.05) on the same data, where one sample consisted of the filter scores of all TPs (n=183) and the other sample consisted of the scores of all FPs (n=158). All 8 filters rejected the null hypothesis (Table 5), suggesting that FPs can be discriminated from TPs using empirically-thresholded filter scoring. Application of the intercandidate contour symmetry filter (Methods 3.VIII) achieved the largest overall reduction of FPs (44.9%), and eliminated the most SCS-induced FPs (43 of 51). The max width filter (Methods 3. IV) yielded the next largest reduction in FPs (27.8%) and was the most efficient filter for detecting fragmentation-induced FPs (8 of 10).

Additional FPs were eliminated by combining multiple segmentation filters (see Methods 3). Since individual filters were separately thresholded to avoid elimination of TPs (see Methods 3.2), the inclusive disjunction (logical "or" operation) of multiple filters had a negligible impact on TPs, while producing a stronger FP discriminator. Different combinations of filters were tested using forward selection. The best performing filter subset (collectively termed "FP filters") consisted of a combination of 5 filters (I+IV+V+VI+VIII) that achieved a combined rate of FP removal of 58.9%. In comparison, the combination of filters IV+VIII accounted for most (54.4%) of the FPs eliminated, with incremental improvements resulting from <5 additional filters. Performance of these filters was evaluated on 3 sets of metaphase images (Table 7), consisting of 2 HC image sets (HC-low and HC-high, which were used during filter development) and an independent low dose image set from CNL. On average, 55±9.6% of FPs were removed among all sets; individually the filters eliminated 52% of FPs from the CNL set, which was comparable to the HC sets (66% and 48% for low and high dose sets, respectively). All TPs were retained in each of the sets after processing of FPs (i.e. 100% specificity).

Figure 5:
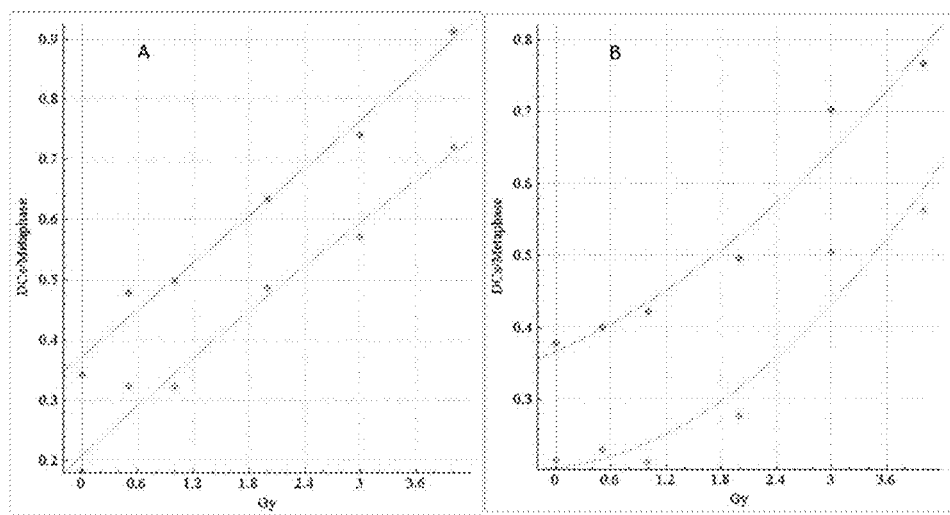
FIG. 5. Calibration curves for HC and CNL samples. The dose-response calibration curves for (A) HC and (B) CNL metaphase cell image sample data. Response (mean DC frequency) on vertical axis, corresponding radiation dose (Gy) on horizontal axis. Green curves are based on unfiltered images, cyan curves were derived by recomputing DC frequencies after applying FP filters (filters I+IV+V+VI+VIII) to these datasets. HC curves are constructed by fitting a linear-quadratic curve through all HC calibration samples, CNL curves are similarly constructed from CNL calibration samples (refer to Table 2). The CNL curves consistently show a more pronounced quadratic component than the HC curves, which exhibit a nearly linear response. After applying FP filters (cyan), the curves show a diminished dose-response (green), due to elimination of some detected FP DCs.

Dose-response calibration curves for HC and CNL data were generated in ADCI to investigate the effect of the filters on dose estimation accuracy (FIG. 5). Dose accuracy was assessed by determining the absolute error (absolute difference between dose estimate and true physical dose). For comparison, the dose estimates of 6 test samples (3 from HC, 3 from CNL) were compared which were either unfiltered and in which combinatorial FP filters were applied (Table 8). In samples that were manually curated by CNL, accuracy was also improved >2-fold by applying the 5 combined FP filters (average error decreased from 0.43 Gy to 0.18 Gy).

The dose accuracy in the HC samples was impacted by addition of these filters (mean absolute error increased from 0.85 Gy to 1.03 Gy). One explanation was either the filters were removing many TPs inadvertently, or FPs removed by the filters were offsetting previously undetected DCs (false negatives) in the HC samples. All objects eliminated with these filters in the 3 HC samples were reviewed and classified as either TP or FP, and the FP specificity across the samples was determined (Table 9). Similar to earlier findings, the FP filters exhibited very high specificity for FPs (97.7-100%), indicating that the filters retained high specificity for TPs in the HC samples.

We hypothesized that the difference in image selection protocols was responsible for the discrepancies seen in classification performance and dose estimation accuracy between the two sources. While CNL manually selected for images deemed suitable for DCA analysis, image selection at HC was done with an automated metaphase classifier that effectively removed only images lacking metaphases (see Methods 1). Manual review of images in the HC and CNL samples confirmed noticeable differences in image quality: In concordance with findings from our previous study[1], CNL data contained more images with well-spread, minimally-overlapping chromosomes, and fewer images with extreme SCS and chromosome fragments (complete dissociation of sister chromatids). The HC data contained a greater percentage of high-band-level (less condensed) chromosomes, characteristic of prometaphase/early-metaphase cell images. These chromosomes were the source of many unfiltered FPs, due to the lack of a strong primary constriction at the centromere.

Figure 6:
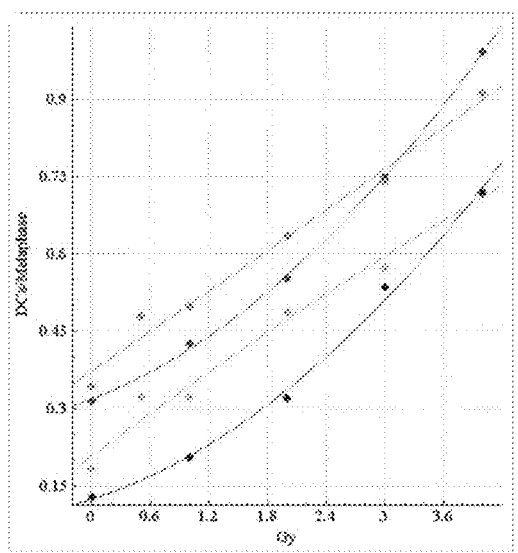
FIG. 6. Original vs. manually curated calibration curves for HC samples. The dose-response calibration curves for HC sample data, with and without FP filters applied, before and after curation. Response (mean DC frequency) on vertical axis, corresponding radiation dose (Gy) on horizontal axis. Green curve is not curated with all images included, cyan curve is not curated with FP filters applied, red curve is curated but unfiltered, and blue curve is curated and FP filters have been applied. Uncurated curves were generated from 0, 0.5, 1, 2, 3 and 4 Gy calibration image data (see Table 2). Curated curves were generated from the same data (however 0.5 Gy was not included) after lower quality images were manually removed (see Methods 6). After manual curation, the curves show a stronger quadratic component, similar to the CNL curves (see FIG. 5).

A new set of HC calibration curves were then generated from manually curated, selected images from calibration samples (FIG. 6). Images were excluded based on IAEA criteria[17], along with cells exhibiting long chromosomes in early prometaphase (Methods 5). (Table 10). Dose estimation accuracy of the HC samples (INTC03S01, INTC03S08 and INTC03S10) was significantly improved by enabling the 5 FP segmentation filters (mean unfiltered absolute error was 0.37 Gy, and was 0.15 Gy with the filters; Table 10). Therefore, application of FP filters to both CNL and curated HC data led to >2-fold reduction in the mean absolute error of the estimated dose (p=0.024, paired two tailed t-test).

Example 2. Application of Image Selection Models

Assessment of image selection was challenging, as no objective standard exists. Cell selection by cytogenetic experts is based on their knowledge of metaphase chromosome conformation, sensitivity, and even individual preferences in interpreting images which are sometimes inconsistent. Therefore, image selection methods were evaluated through dose estimation of filtered test samples and comparisons with known physical exposures. The images in all calibration and test samples were processed by the same image selection method. Dose estimates of test samples are calculated using a curve fit to calibration samples. Dose estimation errors indicate the accuracy of dicentric chromosome detection, and consequently imply the effectiveness of image selection method.

To rank images with the combined z-score method, a weight vector corresponding to each of the 6 filters comprising the total score was first determined. Optimal weights were obtained by searching a large number of possible values among the set of HC calibration samples for those exhibiting smallest residuals when fit to the curve. The potential weights were defined as integers ranging from [1, 5]. This limited the search space and eased computational complexity, but nevertheless ensured that diverse combinations of weights were evaluated. In experiments, three optimal weight vectors, namely [5, 2, 4, 3, 4, 1] [4, 3, 4, 5, 2, 1] and [1, 2, 1, 5, 1, 5], were used for dose estimation.

Figure 7:
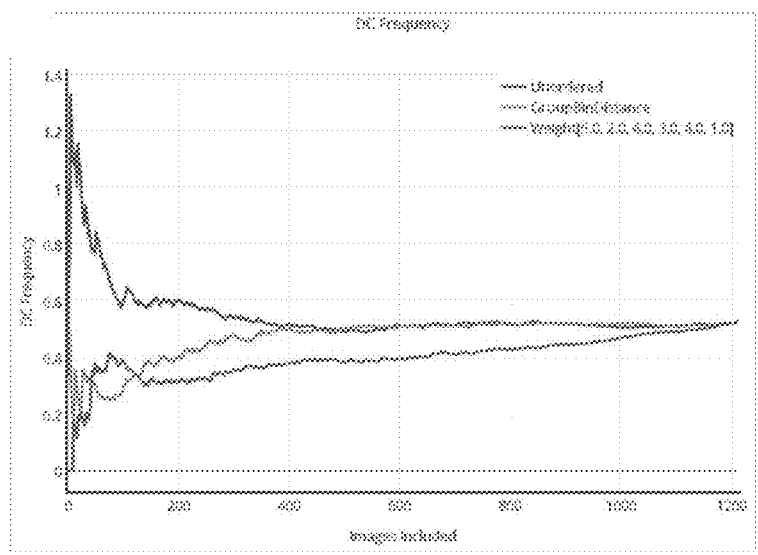
FIG. 7. Relation between DC frequency (y-axis) and number of included top images (x-axis) when images are ranked by different scoring methods, in sample HC3 Gy. Blue, orange and green curves correspond to unordered images (alphabetic order of image names), images sorted by group bin method and images sorted by combined z-score method, respectively. Figure was generated using Plotly software.
Figure 8:
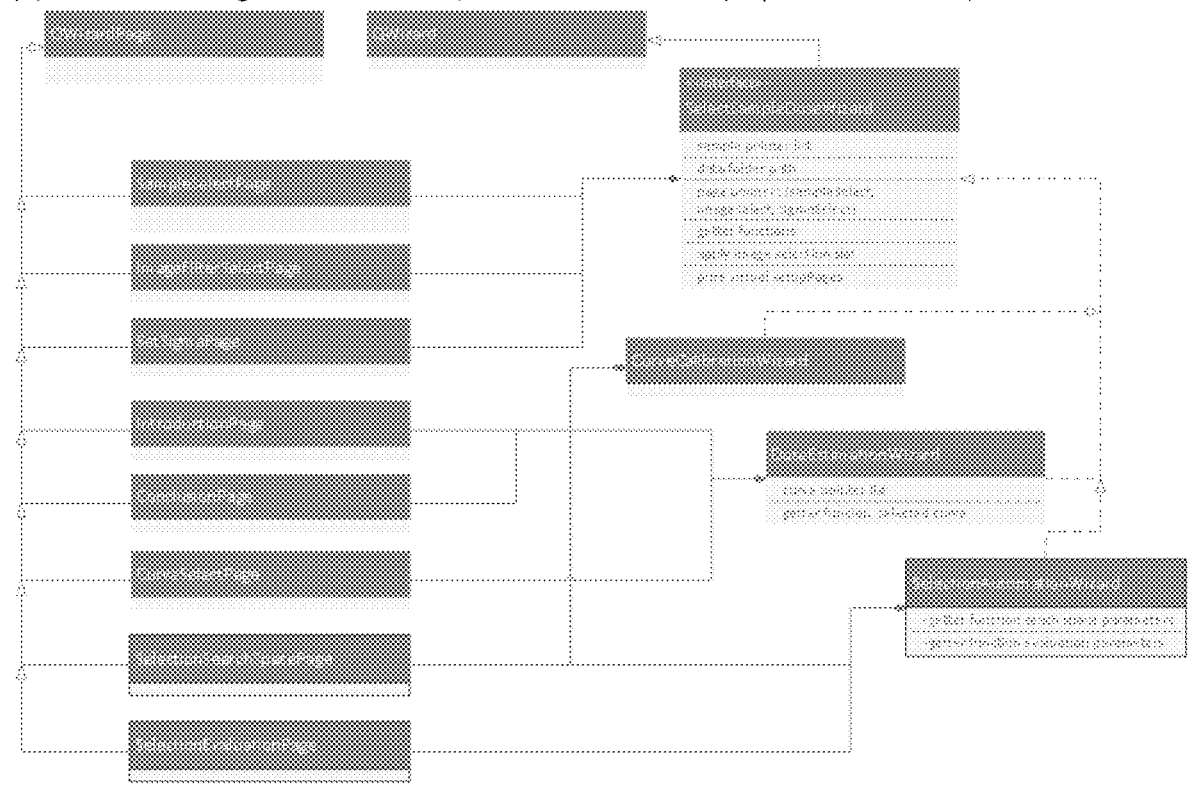
FIG. 8. The structure of UML diagram. Panels show: (A) Two new wizard page classes (search space, evaluation) are required. Selection model generation dialog is a new class. The dialogs display three panels to i) enter samples and specify parameters and model evaluation methods, ii) show progress bar, and iii) displays results after selecting best models. Besides the user interface members, it implements the process to find optimal image selection models. The Wizard reuses class 'Sample', 'ImageSelectionModel' and 'LinearModel'. (c) Presentation of selection models generation result is part of selection model generation dialog, or might have its own class. Reuse class 'ImageSelectionDialog'.
Figure 8:
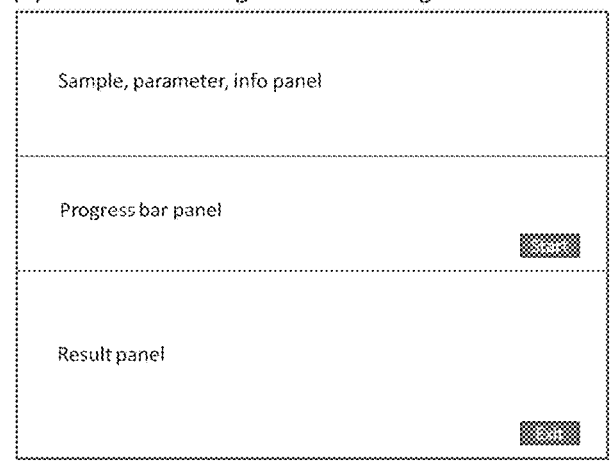
Figure 8:
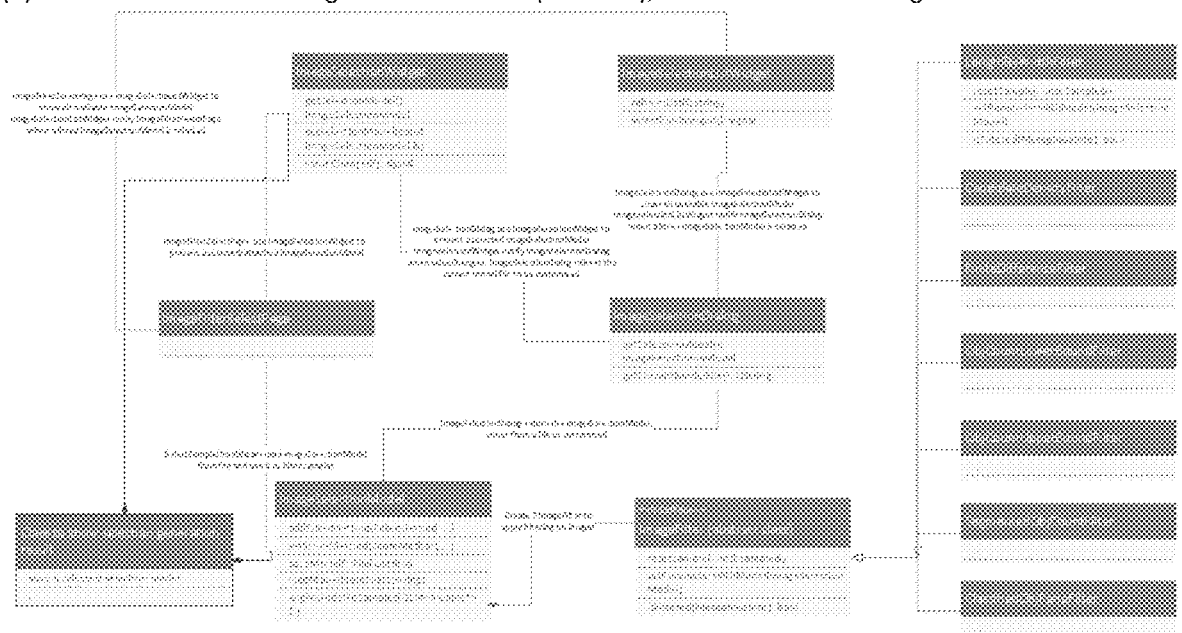

After images were assigned scores and sorted according to their combined z-scores (or by the chromosome group bin method—see below), the 250 top ranked images were subsequently selected to determine dicentric aberration frequency for that sample. An adequate number of top ranked images are selected to provide sufficient images to generate a reproducible DC frequency for that sample. The top ranked image set also has to effectively remove poor quality images that could distort the DC frequency. IAEA has recommended at least 100 DCs be detected for samples with physical doses >1 Gy. In practice, laboratories score >250 images, but often more. Considering the total number of images in a sample ranges from 500 to 1500, we found that selecting the 250 top scoring images gave satisfactory results. Upon integration of ADCI with Metafer metaphase cell detection software, the time required for the automated microscope system to capture a set of images in a sample will be reduced by at least 50% and as much as 600%. FIG. 7 indicates that the DC frequency for the HC3 Gy calibration sample stabilizes after at least 250 to 300 top images were included. Similar results were obtained for other test and calibration samples (not shown). DC frequencies can differ between image selection methods because each method can select different images. When the number of top ranked images significantly exceeds 300 images, differences between the specific image selection methods are minimized as they share increasing numbers of selected images. Unfiltered randomly sampled images from this sample tend to exhibit higher overall DC frequencies due to increased numbers of FP DCs.

The deviations of estimated doses of all of the HC and CNL test samples, respectively, from physical doses, were determined for various ADCI image selection models (Tables 10 and 11). For comparison, the dose estimation results of unselected, comprehensive sets of images for each sample are presented. Deviations of ≤0.5 Gy from their calibrated physical dose are acceptable for triage biodosimetry[5,12]. For the unfiltered HC samples, the average absolute error is 0.8 Gy, with a single sample, INTC03S01, fulfilling the triage criteria. The image selection model that combines filters I-III and chromosome group bin method produces the best result. Dose estimates for four samples (INTC03S01, INTC03S08, INTC03S10 and INTC03S05) are acceptable. The combined z-score method with the filter weights: [1, 2, 1, 5, 1, 5] resulted in the least accurate estimates. Here, the average error is ~1 Gy, and only INTC03S05 had an acceptable dose estimate. Of the five unfiltered CNL samples, only INTC03S08 had an acceptable dose estimate. After applying image selection models, a pan-filter set using all of the available filters I-VI gave the most accurate results. The average absolute error was ~0.3 Gy, and 4 of 5 samples (INTC03S08, INTC03S04, INTC03S05 and INTC03S07) exhibited doses in the acceptable range.

Image selection rejects poor images and reduces FP DCs if sufficient quantities of images remain to provide reliable DC frequencies. Although >250 images were usually present after scoring and ranking, application of image filters can result in fewer remaining images for analysis. After applying the pan-filter set, sample CNL-INTC03S08 consisted of 195 metaphase cells. After applying the combined image selection model to the HC samples, sample HC-INTC03S07 consisted of only 109 metaphase cells. This sample was relatively lower quality than others in this set, and the unfiltered set of metaphase images was smaller than the recommended minimum (500 cells), consisting of 477 cells (Table 12).

Example 3. Automated Search for Optimized Image Selection Models

The total number of potential image selection models is unlimited and effective image selection model configurations differ between laboratories due to their laboratory specific sample preparation procedures. To alleviate the need to manually create and test sets of image selection models, ADCI provides automated search functionality to locate optimal models for given samples. The automated search may take several hours to complete, depending on the size of the search configuration space.

Automated searches of optimal image selection models involve two steps: generation of a pool of possible image selection models and evaluation of each model in the pool.

Generating Models

An image selection model consists of morphological filters and/or image scoring. Each filter can either be enabled at a user specified threshold value or be disabled altogether. Images can be scored using the combined z-score method (contents of an image selection model heading) or group bin method. The combined z-score method requires a weight vector in which weights can be adjusted. The number of selected top images after images are scored and ranked is also adjustable. The automated search for optimal image selection models has the capability to test all of these configurations.

Image selection models are categorized in 3 groups:

(1) Filter-Only Models

A typical configuration for automated model generation in this group is shown in the table below. A pool of selection models containing all permutations of the filter thresholds listed in the table are generated. Note each filter may also be in a disabled state in addition to the values listed. Square brackets indicate a pair of threshold values in the format: [lower bound, upper bound].

| Filters | Filtering method | Threshold values to test |
|---|---|---|
| Length-Width Ratio | Exclude if length-width ratio z-score is > threshold | 1.0, 1.5, 2.0 |
| Centromere Density | Exclude if centromere density z-score is > threshold | 1.0, 1.5, 2.0 |
| Finite Difference | Exclude if finite difference z-score is < threshold | −1.0, −1.5, −2.0 |
| Object Count | Exclude if count is < lower bound or > upper bound | [40, 60], [40, 65] |
| Segmented Object Count | Exclude if count is < lower bound or > upper bound | [35, 50] |
| Classified Object Ratio | Exclude if the ratio is < threshold | 0.6, 0.7 |

(2) Combined z-Score Models without Filtering

Image selection models in this group use a weight vector to score and rank images, then select a certain number of top images. Typically, values 0, 1, 2, 3, 4, 5 are tested for weights and numbers 250, 300, 400, 500 are tested for selecting top images.

(3) Filter and then Group Bin Models

In this group, a model will first apply filtering and then use the group bin method to score and rank images. Configurations in group 1 and group 2 can be used to generate models in this group.

The total number of generated image selection models can be very large. If the configurations shown above are used, 192,384 models are generated.

Model Evaluation

Image selection models in the pool can be assessed using a set of samples with known physical doses. An image selection model is applied to all evaluation samples. Sample quality after image selection is evaluated by one of the user-specified methods listed below, which return a score indicating the effectiveness of the model. Three evaluation methods can be selected:

1. (a) P-Value of Poisson Fits
  Each evaluation sample calculates a p-value of its Poisson fit, determined by a user-specified SVM sigma. P-values of all samples combine to a single score through the use of Fisher's method. The score will be 'nan', not-a-number, if any evaluation sample gives 'nan' p-value, making the evaluation invalid. When it happens, please try a larger sigma value or use other evaluation methods.
2. (b) Curve Fitting Residual
  After users specify an SVM sigma value, all evaluation samples are used to fit a calibration curve. The squares of samples' fitting residuals on the curve are summed to a single score.
3. (c) Leave-One-Out Dose Estimation
  Users first specify an SVM sigma value. One sample in the evaluation set is used as a dose estimation test sample. While the remaining are used for curve calibration from which the dose estimation error is calculated for the test sample. The process is repeated until every evaluation sample has been used as test sample. The dose estimation error of all these tests are squared and summed to form a single score.

Image selection models with the lowest scores are the optimal models resulting from the search.

Implementation of the Optimized Image Selection Search Wizard.

Configure Image Selection Model Generation. This is an optional configuration step. Default values are prefilled in this dialog whether it is opened or not. To facilitate automated. generation of image selection models, the software stores multiple options for filter thresholds, weights of the combined z-score, and number of selected top images. These values can be adjusted by users. To open this dialog click "Settings" in the menu bar at the top of the software window and select "Image Selection Optimization Settings". The dialog to the right will be displayed and configuration changes can be made within the dialog.

Automated searches for optimal image selection model start from "Image Selection Optimization" wizard. It can be opened from the "Wizards" menu. A step by step guide to the wizard is provided below.

Introduction. Before proceeding to the next steps of the wizard, processed samples must be present within the main GUI. The "curve fit residual" evaluation method will require at least 3 samples, the "leave-1-out dose estimation" method at least 4 samples.

Select Samples. Sample selection in this wizard is the same as in the "Curve Calibration" wizard. Selected samples will be used to evaluate image selection models during optimization. Enter physical doses of these samples if they are not auto-filled or if they were auto-filled incorrectly.

Select an SVM Sigma Value. Select an SVM sigma to use for optimization. It determines dicentric chromosome distributions, which are used to calculate p-values of Poisson fit, and dicentric chromosome frequencies, which are used in the "curve fit residual" method and the "leave-1-out dose estimation" method.

Configure Image Selection Model Search. As described previously, possible image selection models are logically categorized into 3 groups. In ADCI, users have the option to include or exclude a group in the search of optimal models. Place a checkmark beside groups that are intended to be searched. Leave undesired groups unchecked. Image selection models in checked groups will be generated according to configurations in "Image Selection Optimization Settings".

Generally, it is desirable to select all parameter groups to perform a full search. However, if lengthy compute time is concerning or the search is only to be used for a quick test or tutorial, the number of image selection models to be searched can be reduced by leaving some of groups unselected.

Select and evaluation method. Select one of the three evaluation methods to determine which models exhibit the best accuracy for that method. Please recall that "Curve Fit Residuals" requires at least 3 selected samples to work correctly, and "Leave-1-out Dose Estimation Errors" needs at least 4 selected samples.

Summary Ensure the previous selections are correct on the summary screen. Note values entered on previous screens can be edited by clicking the blue button on the top left of the wizard dialog. Click "Finish" to complete the wizard and bring up the "Optimal Image Selection Model Search" dialog.

Optimal Image Selection Model Dialog.

The automated search for optimal image selection models is performed in this dialog. A summary, including model generation configuration and evaluation method and the samples to be evaluated, is shown in the top part of the screen. Users can verify if the search parameters are correct before beginning the search, determine the time for search, generate a report when complete or abort the wizard.

Click the "Start" button to start the search. The progress will be indicated by a progress bar. The entire search may take a few minutes to a few hours, depending on the number of models being searched, evaluation method ("leave-1-out dose estimation" method will take longer time), and computer hardware. Users can abort the search any time by clicking the "Abort" button.

When the search finishes, optimal image selection models will be displayed in ascending order of evaluation score in the "Search Result" panel. Models are named according to their automatically assigned numbers during model generation. The evaluation score of each model is displayed along with the model in the list. The list shows 10 best models by default. Up to 50 best models can be displayed by clicking the "More" button.

After selecting an image selection model in the list, its content will be shown in the widget to the right of the list. It is the same widget used for image selection models in "Metaphase Viewer", "Curve Calibration" wizard and "Dose Estimation" wizard. Please note that any modification made to the widget will not change the actual model.

A selected image selection model can be saved by clicking the "Save" button. Its evaluation performance on each sample can be viewed by clicking the "View" button and specifying an evaluation sample. If the evaluation method is "p-values of Poisson fit", the plot panel will show the sample's Poisson fit. Similarly, the plot panel will show calibration curve and dose estimation for the methods "Curve fit residual" and "Leave-1-out dose estimation errors", respectively.

Figure 9:
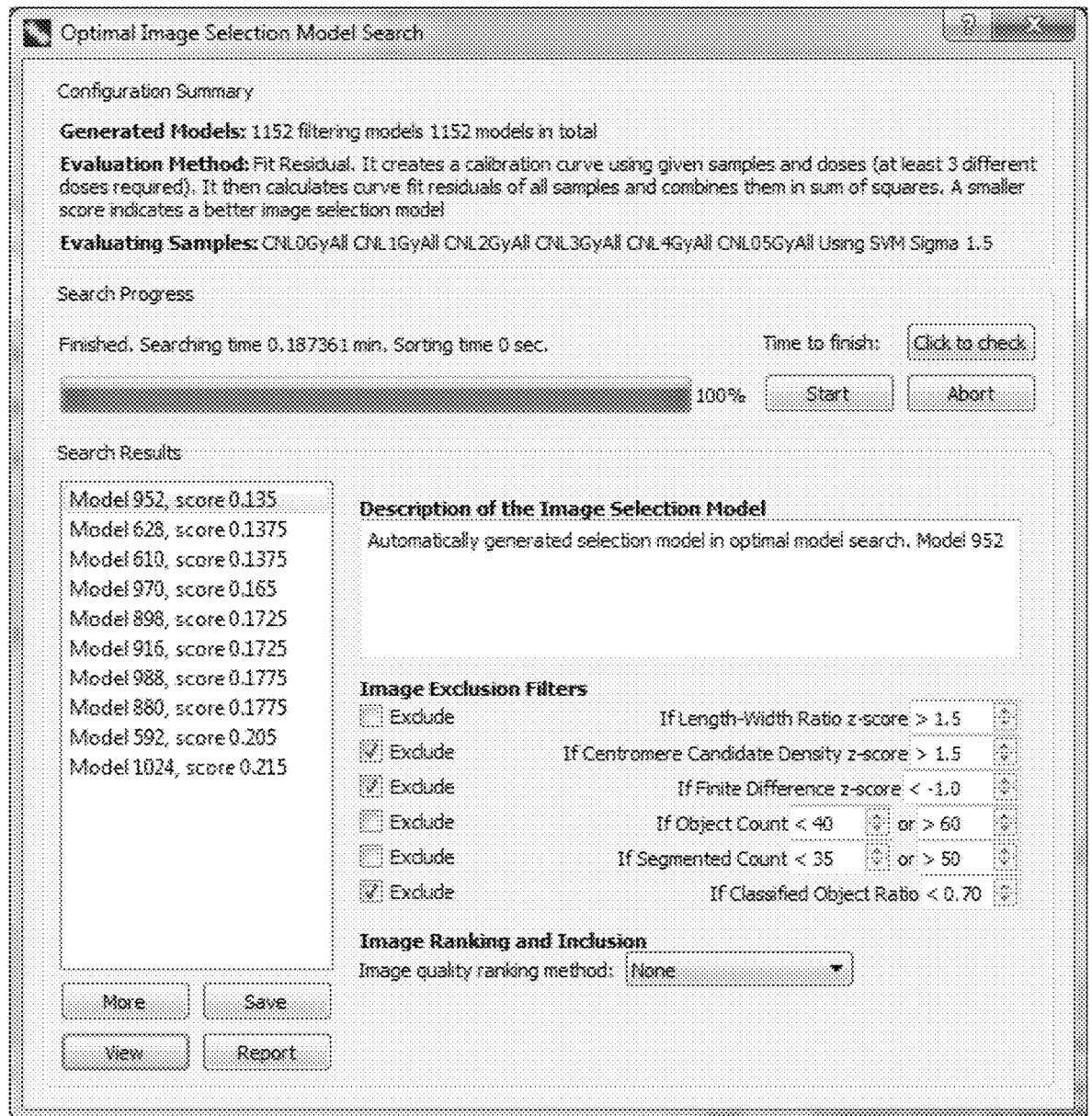
FIG. 9. Summary of model generation configuration and evaluation method and the samples to be evaluated, and display of selected model parameters upon completion of the search.

After an optimal image selection model has been saved, it will appear alongside other saved image selection models and preset image selection models wherever image selection models are listed (FIG. 9). The metaphase image viewer can be used to view the content of a saved selection model.

A request to prepare a "Report" displaying the optimal image selection model parameters, and the associated calibration curve and dose estimates for samples evaluated with the selected method has been implemented in the final screen of the wizard.

Time Required to Perform Optimized Image Selection Model Search

The time required to perform a search depends on the number of models being generated/examined. The number of models examined is determined by the selected image selection model categories to search (image filtering, combined z score, group bin) as well as settings specified in "Settings"→"Image Selection Optimization Settings". If the search space is large (>50,000 parameter combinations), ADCI may require hours to finish the optimization.

Search runtime is proportional to the number of samples used for evaluation. The particular evaluation method selected also influences the search execution time. The 'p-value of Poisson' and 'curve fit residual' methods take approximately the same amount of time. The 'Leave-one-out' method requires longer to complete, and is proportional to the number of samples being evaluated. For example, to finish a search using 10 evaluating samples, 'leave-one-out' will take approximately 10-times longer than either 'curve fit residual' or 'p-value of Poisson'. These methods often produce different optimal models and it is not possible to predict which method will produce the best performing model.

Example 4. Sample Quality Assessment after Image Selection

To evaluate whether the image selection models improved sample quality, a Chi squared goodness of fit test was performed on the observed DC/cell vs. Poisson distributions for the CNL and HC samples, both prior to and after automated and manual image selection (Table 12). Manual image selection for CNL samples was performed by CNL during sample preparation, while image selection for HC samples was performed on unselected datasets (see Methods 5; samples HC-INTC03S01, HC-INTC03S08, HC-INTC03S10 were analyzed, despite <500 images being available). For each laboratory, the best performing image selection models were used for FP and image level filtering (Tables 10 and 11). Image selection with filters I-III and chromosome group bin method was applied to HC sample data, whereas filters I-VI were applied to the CNL data. At the 1% significance level (i.e. Poisson goodness-of-fit, $p \leq 0.01$), 86% (19 of 22) of unfiltered samples are significantly differed from the Poisson distribution, and 76% (13 of 17) of manually- and 77% (17 of 22) of automatically-selected samples did not differ; manually curated and uncurated sample groups also significantly differed from each other ($p=0.0021$; one-tailed Wilcoxon Signed-Rank Test, $\alpha=0.05$, $n=17$). Therefore, the Poisson goodness of fit measures changes in overall sample quality from image model selection. While the Poisson score is improved for all of the automatically selected datasets, the lowest quality samples (CNL1 Gy, CNL05 Gy, CNL-INTC03S01, HC-INTC03S05, HC-INTC03S07) were still rejected as Poisson-distributed after automated filtering.

LITERATURE REFERENCES

Blakely, W. F., Salter, C. A., and Prasanna, P. G. (2005) Early-response biological dosimetry—recommended countermeasure enhancements for mass-casualty radiological incidents and terrorism, *Health physics* 89, 494-504.

Wilkins R C, Romm H, Kao T C, Awa A A, Yoshida M A, Livingston G K, Jenkins M S, Oestreicher U, Pellmar T C, Prasanna PG (2008) Interlaboratory comparison of the dicentric chromosome assay for radiation biodosimetry in mass casualty events. *Radiation Research* 169, 551-560.

Bauchinger M. Cytogenetic effects in human lymphocytes as a dosimetry system. In: Eisert W S, Mendelsohn M L eds. Biological dosimetry: Cytometric approaches to mammalian systems. Berlin: Springer-Verlag; 15-24 (1984).

Lloyd D C, Edwards A A, Prosser J S. Chromosome aberrations induced in human lymphocytes by in vitro acute X and Gamma radiation. Rad. Prot. Biodosimetry. 15:83-88 (1986).

International Atomic Energy Agency (IAEA). Cytogenetic analysis for radiation dose assessment. Technical Report Series No. 405, Vienna (2001).

International Atomic Energy Agency (IAEA). Cytogenetic Dosimetry: Applications in Preparedness for and Response to Radiation Emergencies, Vienna (2011).

Schunck C., Johannes T, Varga D, Lorch T and Plesch A, New developments in automated cytogenetic imaging: unattended scoring of dicentric chromosomes, micronuclei, single cell gel electrophoresis, and fluorescence signals. Cytogenet. Genome Res. 104, 383-389 (2004).

Ainsbury, E. A., Livingston, G. K., Abbott, M. G., Moquet, J. E., Hone, P. A., Jenkins, M. S., Christensen, D. M., Lloyd, D. C. and Rothkamm, K. Interlaboratory variation in scoring dicentric chromosomes in a case of partial-body x-ray exposure: implications for biodosimetry networking and cytogenetic 'triage mode' scoring. Radiat. Res. 172: 746-752 (2009).

Lloyd D C, Edwards A A, Moquet J E, Guerrero-Carbajaal Y C. The role of cytogenetics in early triage of radiation casualties. Appl. Radiat. Isot. 52:1107-1112 (2000).

Flegal, F N., Devantier, Y., McNamee, J P., Wilkins, R C. Quickscan dicentric chromosome analysis for radiation biodosimetry. Health Phys. 98: 276-281 (2010).

Vaurijoux, A., Gruel, G., Pouzoulet, F., Gregoire, E., Martin, C., Roch-Lefèvre, S., Voisin, P., Voisin, P. and Roy, L., Strategy for population triage based on dicentric analysis. Radiat Res 171:541-548 (2009).

Vaurijoux A, Gruel G, Gregoire E, Roch-Lefevre S, Voisin P, Martin C, Voisin P, Roy L, and Barquinero J-F. Automatic Dicentric Scoring a Real Option to Be Used in Biological Dosimetry. Radiation Emergency Medicine. 4:16-21 (2015).

Gruel G., Grégoire E, Lecas S, Martin C, Roch-Lefevre S, Vaurijoux A, Voisin P, Voisin P, and Barquinero, J-F. Biological Dosimetry by Automated Dicentric Scoring in a Simulated Emergency. Radiation Res. 179: 557-569 (2013)

Zhou, W., Bovik, A. C., Sheikh, H. R., and Simoncelli, E. P. (2004) Image quality assessment: from error visibility to structural similarity, *IEEE Transactions on Image Processing* 13, 600-612.

Nill, N. B., and Bouzas, B. (1992) Objective image quality measure derived from digital image power spectra, *OPTICE* 31, 813-825.

Narwaria, M., and Lin, W. (2010) Objective Image Quality Assessment Based on Support Vector Regression, *IEEE Transactions on Neural Networks* 21, 515-519.

Li, Y., Knoll, J. H. M., Wilkins, R. C., Flegal, F. N., and Rogan, P. K. (2016) Automated discrimination of dicentric and monocentric chromosomes by machine learning-based image processing, *Microscopy Research and Technique* 79, 383-402.

Arachchige, A. S., Samarabandu, J., Knoll, J., Khan, W., and Rogan, P. (2010) An image processing algorithm for accurate extraction of the centerline from human metaphase chromosomes, In *Image Processing (ICIP)*, 2010 17th IEEE International Conference on, pp 3613-3616.

Arachchige, A. S., Samarabandu, J., Rogan, P. K., and Knoll, J. H. M. (2012) Intensity integrated Laplacian algorithm for human metaphase chromosome centromere detection, In *Electrical & Computer Engineering (CCECE)*, 2012 25th IEEE Canadian Conference on, pp 1-4.

Arachchige, A. S., Samarabandu, J., Knoll, J. H., and Rogan, P. K. (2013) Intensity integrated Laplacian-based thickness measurement for detecting human metaphase chromosome centromere location, *IEEE transactions on biomedical engineering* 60, 2005-2013.

Subasinghe, A., Samarabandu, J., Li, Y., Wilkins, R., Flegal, F., Knoll, J. H. M., and Rogan, P. K. (2016) Centromere Detection of Human Metaphase Chromosome Images using a Candidate Based Method, *F1000Research* 5, 1565, 2016.

Rogan, P. K., Li, Y., Wilkins, R. C., Flegal, F. N., and Knoll, J. H. M. (2016) Radiation Dose Estimation by Automated Cytogenetic Biodosimetry, *Radiation Protection Dosimetry* 172, 207-217.

Rieder, C. L., and Palazzo, R. E. (1992) Colcemid and the mitotic cycle, *Journal of cell science* 102 (Pt 3), 387-392.

Sethakulvichai, W., Manitpornsut, S., Wiboonrat, M., Lila-kiatsakun, W., Assawamakin, A., and Tongsima, S. (2012) Estimation of band level resolutions of human chromosome images, In *Computer Science and Software Engineering (JCSSE)*, 2012 International Joint Conference on, pp 276-282.

Carothers, A., and Piper, J. (1994) Computer-aided classification of human chromosomes: a review, *Statistics and Computing* 4, 161-171.

International Standing Committee on Human Cytogenetic Nomenclature, Shaffer, L. G., McGowan-Jordan, J., and Schmid, M. (2013) ISCN 2013: *An International System for Human Cytogenetic Nomenclature* (2013), Karger. Tables

TABLE 1

Metaphase image sets used in development and validation of DC filters.

| Dataset Name | HC-mixed* | | CNL-low |
| --- | --- | --- | --- |
| | HC-low | HC-high | |
| Lab source | Health Canada | Health Canada | Canadian Nuclear Laboratories |
| Radiation dose (Gy) | 1 | 3-4 | 1 |
| No. of images | 198 | 216 | 256 |
| No. of chromosomes** | 8041 | 8697 | 10583 |
| No. of TPs | 20 | 163 | 14 |
| No. of FPs | 97 | 61 | 82 |

*HC-mixed refers to a combined set of all images from both the HC-low + HC-high datasets
**Defined as number of valid segmented objects defined by ADCI.

TABLE 2

Metaphase image samples used in construction of dose calibration curves.

| Sample (HC or CNL)xGy | Physical dose | No. of images, HC | No. of images, CNL |
| --- | --- | --- | --- |
| 0 Gy | 0 Gy | 731 | 798 |
| 0.5 Gy | 0.5 Gy | 586 | 1532 |
| 1 Gy | 1 Gy | 1566 | 841 |
| 2 Gy | 2 Gy | 1147 | 996 |
| 3 Gy | 3 Gy | 1212 | 1188 |
| 4 Gy | 4 Gy | 909 | 1635 |

TABLE 3

Metaphase image samples used in evaluation of dose assessment performance.

| Sample name | Physical Dose (Gy) | No. of images, HC[1] preparation | No. of images, CNL[2] preparation |
| --- | --- | --- | --- |
| INTC03S01 | 3.1 | 540 | 500 |
| INTC03S08 | 2.3 | 637 | 500 |
| INTC03S10 | 1.4 | 708 | n/a |
| INTC03S04 | 1.8 | 996 | 957 |

TABLE 3-continued

Metaphase image samples used in evaluation of dose assessment performance.

| Sample name | Physical Dose (Gy) | No. of images, HC[1] preparation | No. of images, CNL[2] preparation |
|---|---|---|---|
| INTC03S05 | 2.8 | 1136 | 1527 |
| INTC03S07 | 3.4 | 477 | 735 |

[1]HC: Health Canada.
[2]CNL: Canadian Nuclear Laboratory.
n/a: sample data were not available.

TABLE 4

Comparison of FP subclass targeting between proposed DC filters.

| | No. FP DCs removed filtering by morphological subclass* | | | | | |
|---|---|---|---|---|---|---|
| DC filter designation** | SCS (n = 51) | Fragment (n = 10) | Overlap (n = 17) | Noise (n = 5) | Debris (n = 4) | ML (n = 11) |
| I: Area | 19 | 6 | 0 | 0 | 3 | 1 |
| II: Mean width | 14 | 6 | 0 | 0 | 2 | 0 |
| III: Median width | 12 | 5 | 0 | 0 | 3 | 0 |
| IV: Max width | 23 | 8 | 0 | 0 | 3 | 0 |
| V: Centromere width | 8 | 3 | 0 | 0 | 3 | 0 |
| VI: Oblongness | 31 | 1 | 2 | 0 | 0 | 0 |
| VII: Contour symmetry | 11 | 0 | 0 | 0 | 0 | 0 |
| VIII: Intercandidate contour symmetry | 43 | 2 | 3 | 1 | 1 | 2 |

*See Methods 2 for description of each subclass. Calculated from HC-low image set in Table 1.
**See Methods 3.1 for description of each filter.

TABLE 5

Comparison of FP discrimination ability between proposed DC filters.

| DC filter designation** | 2-sample K-S, TPs/ FPs, p-value* | FP removed (%)* |
|---|---|---|
| I: Area | $2.2 \times 10^{-18}$ | 22.2 |
| II: Mean width | $9.2 \times 10^{-10}$ | 16.5 |
| III: Median width | $3.3 \times 10^{-9}$ | 14.6 |
| IV: Max width | $3.3 \times 10^{-8}$ | 27.8 |
| V: Centromere width | $8.8 \times 10^{-3}$ | 13.9 |
| VI: Oblongness | $1.1 \times 10^{-24}$ | 27.2 |
| VII: Contour symmetry | $1.2 \times 10^{-8}$ | 10.1 |
| VIII: Intercandidate contour symmetry | $4.0 \times 10^{-30}$ | 44.9 |

*Calculated from HC-mixed image set from Table 1.
**See Methods 3.1 for description of each filter.

TABLE 6

Forward selection results by combining subsets of DC filters.

| DC filter subset** | FP removed (%)* |
|---|---|
| 1-filter: VIII | 44.9 |
| 2-filters: VIII + IV | 54.4 |
| 3-filters: VIII + IV + V | 56.3 |
| 4-filters: VIII + IV + V + VI | 58.2 |
| 5-filters: VIII + IV + V + VI + I | 58.9 |

*Calculated from HC-mixed image dataset from Table 1.
**See Methods 3.1 for description of filters.

TABLE 7

Performance evaluation of FP filters* on development and validation image datasets.

| Image set** | No. of TP DCs removed | No. of FP DCs removed | FP removed (%) |
|---|---|---|---|
| HC-low | 0 | 64 | 66 |
| HC-high | 0 | 29 | 48 |
| CNL-low | 0 | 43 | 52 |

*FP filters refer to the subset of filters I + IV + V + VI + VIII (see Methods 3.1).
**See Table 1 for sample details.

TABLE 8

Dose estimation of test samples, with and without FP filters* enabled.

| | HC samples** | | | CNL samples** | | |
|---|---|---|---|---|---|---|
| Physical dose (Gy) | 3.1 | 2.3 | 1.4 | 1.8 | 2.8 | 3.4 |
| Estimate, unfiltered (Gy) | 3.90 | 1.65 | 0.30 | 1.35 | 2.40 | 2.95 |
| Estimate, FP filters (Gy) | 2.45 | 1.25 | 0.00 | 2.1 | 2.75 | 3.55 |

*FP filters refer to the subset of filters I + IV + V + VI + VIII (see Methods 3.1). Calibration curve image data was not curated or filtered. HC samples were unselected (INTC03S01, INTC03S08, and INTC03S10). The CNL samples were previously manually curated (INTC03S04 [n = 448], INTC03S05 [n = 500], and INTC03S07 [n = 385]).
**See Table 3 for sample details.

TABLE 9

Specificity of FP filters* in HC test samples.

| Image sample** | Total no. of chromosomes removed | No. of TPs removed | No. of FPs removed | Specificity for FPs |
|---|---|---|---|---|
| INTC03S01 | 193 | 0 | 193 | 100% |
| INTC03S08 | 133 | 3 | 130 | 97.7% |
| INTC03S10 | 143 | 2 | 141 | 98.6% |

*FP filters refer to the subset of filters I + IV + V + VI + VIII (see Methods 3.1).
**See Table 3 for sample details.

TABLE 10

Dose estimates and deviations from physical dose for HC test samples after applying image selection models.

| Image selection model | INTC03S01 3.1^ | INTC03S08 2.3 | INTC03S10 1.4 | INTC03S04 1.8 | INTC03S05 2.8 | INTC03S07 3.4 |
|---|---|---|---|---|---|---|
| All images | 2.65, −0.45 | 1.4, −0.9 | 0.15, −1.25 | 3.05, +1.25 | 2.2, −0.6 | 3.95, +0.55 |
| Combined z score, weight [5, 2, 4, 3, 4, 1], top 250 | 2.75, −0.35 | 2, −0.3 | 1.35, −0.05 | 2.85, +1.05 | 2.55, −0.25 | 4, +0.6 |
| Combined z score, weight [4, 3, 4, 5, 2, 1], top 250 | 2.85, −0.25 | 2, −0.3 | 1.25, −0.15 | 2.7, +0.9 | 2.4, −0.4 | 4, +0.6 |
| Combined z score, weight [1, 2, 1, 5, 1, 5], top 250 | 1.6, −1.5 | 1.4, −0.9 | 0.5, −0.9 | 3.6, +1.8 | 2.6, −0.2 | 4, +0.6 |
| Chromosome group bin method, top 250 | 2.55, −0.55 | 2.25, −0.05 | 1.1, −0.3 | 2.45, +0.65 | 2.75, −0.05 | 2.15, −1.25 |
| Filters I-VI | 2.05, −1.05 | 1, −1.3 | 0.35, −0.95 | 1.55, −0.25 | 2.05, −0.75 | 1.2, −2.2 |
| Filters I-III & chromosome group bin method, top 250 | 2.8, −0.3 | 1.95, −0.35 | 1, −0.4 | 2.35, +0.55 | 2.8, +0.0 | 2.25, −1.15 |
| Manual image curation | 2.85, −0.25 | 2.4, +0.1 | 1.25, −0.15 | n/a | n/a | n/a | n/a: manual selection result not available.
^Sample identifier, physical dose (Gy).
FP filters were enabled.

TABLE 11

Dose estimates and deviations from physical dose for CNL test samples after applying image selection models.

| Image selection model | INTC03S01 3.1^ | INTC03S08 2.3 | INTC03S04 1.8 | INTC03S05 2.8 | INTC03S07 3.4 |
|---|---|---|---|---|---|
| All images | 4, +0.9 | 2.6, +0.3 | 2.45, +0.65 | 3.6, +0.8 | 4, +0.6 |
| Combined z score, weight [5, 2, 4, 3, 4, 1], top 250 | 3.95, +0.85 | 2.8, +0.5 | 2, +0.2 | 3, +0.2 | 3.55, +0.15 |
| Combined z score, weight [4, 3, 4, 5, 2, 1], top 250 | 4, +0.9 | 2.7, +0.4 | 1.65, −0.15 | 3.05, +0.25 | 3.95, +0.55 |
| Combined z score, weight [1, 2, 1, 5, 1, 5], top 250 | 3.6, +0.5 | 2.4, +0.1 | 0.65, −1.15 | 2.35, −0.45 | 3.05, −0.35 |
| Chromosome group bin method, top 250 | 4, +0.9 | 2.8, +0.5 | 1.75, −0.05 | 2.5, −0.3 | 4, +0.6 |
| Filters I-VI | 3.75, +0.65 | 2.8, +0.5 | 1.9, +0.1 | 3.05, +0.25 | 3.4, +0.0 |
| Filters I-III & chromosome group bin method, top 250 | 4, +0.9 | 2.75, +0.45 | 1.65, −0.15 | 2.25, −0.55 | 3.95, +0.55 |
| Manual image curation | n/a | n/a | 2.1, +0.3 | 2.75, −0.05 | 3.55, +0.15 | n/a: manual selection result not available.
^Sample identifier, physical dose (Gy).
FP filters were enabled.

TABLE 12

Goodness of fit Poisson scores* of unfiltered, manually- and ADCI-filtered image sets for calibration and test samples.

| Sample | All images | Manual image selection | Automated image selection: morphology filters & chromosome group bin method^ | Automated image selection: morphology filters only# |
|---|---|---|---|---|
| HC0Gy | 1.333e−15 | 2.240e−01 | NaN | n/a4 |
| HC05Gy | 1.232e−01 | unavailable | 3.637e−01 | n/a |
| HC1Gy | 1.669e−18 | 9.996e−01 | 1.049e−01 | n/a |
| HC2Gy | 4.019e−64 | 2.072e−01 | 7.618e−04 | n/a |

TABLE 12-continued

Goodness of fit Poisson scores* of unfiltered, manually- and ADCI-filtered image sets for calibration and test samples.

| Sample | All images | Manual image selection | Automated image selection: morphology filters & chromosome group bin method^ | Automated image selection: morphology filters only# |
|---|---|---|---|---|
| HC3Gy | 2.873e−02 | 4.642e−01 | 6.112e−01 | n/a |
| HC4Gy | 2.596e−04 | 2.215e−01 | 3.127e−01 | n/a |
| HC-INTC03S01 | <2.225e−308+ | 9.052e−01 | 1.170e−01 | n/a |
| HC-INTC03S08 | 1.236e−01 | 4.573e−01 | 8.153e−01 | n/a |
| HC-INTC03S10 | 8.873e−01 | 3.895e−01 | 2.113e−01 | n/a |
| HC-INTC03S04 | 0.000e+00 | unavailable | 2.931e−02 | n/a |
| HC-INTC03S05 | 1.103e−06 | unavailable | 3.544e−03 | n/a |
| HC-INTC03S07 | <2.225e−308 | unavailable | 1.996e−04 | n/a |
| CNL0Gy | 5.174e−03 | 1.254e−01 | n/a | 3.071e−01 |
| CNL05Gy | 1.656e−157 | 1.236e−01 | n/a | 5.955e−32 |
| CNL1Gy | 9.801e−30 | 1.496e−03 | n/a | 1.597e−06 |
| CNL2Gy | 2.340e−147 | <2.225e−308 | n/a | 4.488e−02 |
| CNL3Gy | 8.489e−07 | 6.820e−03 | n/a | 9.914e−01 |
| CNL4Gy | 5.151e−22 | 3.303e−02 | n/a | 1.826e−01 |
| CNL-INTC03S04 | 1.728e−60 | 1.933e−02 | n/a | 5.446e−02 |
| CNL-INTC03S0S | 2.743e−09 | 5.243e−02 | n/a | 3.253e−01 |
| CNL-INTC03S07 | 6.671e−10 | 4.248e−05 | n/a | 4.725e−01 |
| CNL-INTC03S01 | <2.225e−308 | unavailable | n/a | 7.627e−11 |
| CNL-INTC03S08 | 5.253e−16 | unavailable | n/a | 7.768e−01 |

*Poisson score is the p-value of chi-square goodness of fit (without merging bins) of observed distribution of DCs/cell vs. Poisson distribution determined from average DC frequency.
Filtering parameters chosen for each laboratory exhibit dose estimates that are closest to the physical dose:
^HC image sets were filtered with morphological filters I-III and by chromosome group bin score;
CNL image sets were filtered with morphological filters I-VI.
@n/a: not applicable, the other demonstrated image selection method has better dose estimation result.
+Minimum positive floating value in Windows operating system.
NaN: P-value could not be determined due to insufficient degrees of freedom.
Unavailable: manual image selection was not performed.

The invention claimed is:

1. A method of estimation of a radiation exposure by biodosimetry in a sample of cells, said sample of cells prepared for cytogenetic analysis from a single individual, said method performed using an automated digitally controlled microscope system, said method comprising:
(i) acquiring images of cells sequentially, wherein said images of cells contain metaphase chromosomes, and further wherein said images of cells are acquired by using said automated digitally controlled microscope system, the microscope system having a microscope with a computer-controlled digital camera,
(ii) digitally analyzing objects in each image of images of cells of step (i) to determine a property or properties of segmented objects therein, said property or properties including object count, length, width, contour finite difference, and centromere density,
(iii) either selecting or rejecting each image of step (i) based on said property or properties determined in step (ii), thereby creating a set of selected metaphase cell images,
(iv) creating a set of likely dicentric chromosomes by classifying likely dicentric chromosomes in the set of selected metaphase cell images of step (iii), and determining a count of the likely dicentric chromosomes in the set of selected metaphase cell images,
(v) determining which chromosomes of the set of likely dicentric chromosomes from step (iv) are not true dicentric chromosomes using segmentation procedures that discriminate true positive dicentric chromosomes from other objects, thereby identifying false positive dicentric chromosomes and determining a count of false positive dicentric chromosomes in the set of selected metaphase cell images,
(vi) determining a count of true positive di centric chromosomes in each digital image by subtracting the count of false positive dicentric chromosomes of step (v) from the count of images of likely dicentric chromosomes of step (iv),
(vii) selecting a subset of images of step (iii) that fulfill the international Atomic Energy Agency criteria for a minimum number of either metaphase cell images of step (iii) or true positive dicentric chromosomes of step (vi) for determination of a radiation exposure, thereby generating a set of images in which each image contains metaphase chromosomes from a cell,
(viii) determining a dose response for the sample, said dose response being an average dicentric chromosome frequency over all images, by summing the total number of true positive dicentric chromosomes in step (vi) and dividing by the number of images in step (vii),
(ix) computing the radiation exposure using a previously determined dose response related calibration curve that is related to the dose response of step (viii) by the quadratic equation, $Y=aX^2+bX+c$, wherein a, b, and c are coefficients of the curve, and wherein X denotes dose response and Y denotes radiation exposure.

2. The method of estimation of radiation exposure by biodosimetry of claim 1, said classification of a predicted dicentric chromosome, c*, in a metaphase cell digital image as a false positive dicentric chromosome, where $\{c_1, \ldots, c_N\}$ denotes the set of N chromosomes within the image, said predicted dicentric chromosome fulfilling any one or more of the following conditions, which are performed either independently or in combination:
  (i) classifying a predicted dicentric chromosome, c*, as a false positive dicentric chromosome, if the pixel area, A(c), occupied by the chromosome, is related to the areas of all other chromosomes in the same metaphase cell according to: $A(c^*)/median(\{A(c_1), \ldots, A(c_N)\})$ <0.74
  (ii) classifying a predicted dicentric chromosome, c*, as a false positive dicentric chromosome, in which $W_{mean}$(c) denotes the mean value of the width profile of chromosome c, and $W_{mean}(c^*)/median(\{W_{mean}(c_1), \ldots, W_{mean}(c_N)\})$<0.80,
  (iii) classifying a predicted dicentric chromosome, c*, as a false positive dicentric chromosome, in which $W_{med}$(c) denotes the median value of the width profile of chromosome c, and $W_{med}(c^*)/median(\{W_{mean}(c_1), \ldots, W_{mean}(C_N)\})$<0.77,
  (iv) classifying a predicted dicentric chromosome, c*, as a false positive dicentric chromosome, in which $W_{max}$(C) denotes the maximum value of the width profile of chromosome c, and $W_{max}(c^*)/median(\{W_{max}(c1), \ldots, W_{max}(c_N)\})$<0.83,
  (v) classifying a predicted dicentric chromosome, c*, as a false positive dicentric chromosome, in which $W_{cent}$(c) denote the width of chromosome c at the top-ranked centromere candidate, and $W_{cent}(c^*)/median(\{W_{cent}(c_1), \ldots, W_{cent}(c_N)\})$<0.72,
  (vi) classifying a predicted dicentric chromosome, c*, as a false positive dicentric chromosome, in which S(c) denotes the pair of side lengths of the minimum bounding rectangle enclosing the contour of chromosome c, and 1—min(S(c*))/max(S(c*))<0.28,
  (vii) classifying a predicted dicentric chromosome, c*, as a false positive dicentric chromosome, in which L(c) denotes the pair of arc lengths of contour halves produced by partitioning the contour of chromosome c at its centerline endpoints, and min(L(c*))/max(L(c*)) <0.51,
  (viii) classifying a predicted dicentric chromosome, c*, as a false positive dicentric chromosome, in which $L_c$(c) denotes the pair of arc lengths of the contour regions of chromosome c that run between the traceline endpoints of its top 2 centromere candidates, and $min(L_c(c^*))/max(L_c(c^*))$<0.42.

3. The method of estimation of radiation exposure by biodosimetry of claim 1, said digital analysis of images of cells from the same sample, with each image containing chromosomes from a cell in metaphase, the sample comprising M images, $\{I_1, \ldots, I_M\}$, where $\{c_1, \ldots, c_N\}$ denote the set of N chromosomes within image I*, and SD denotes the standard deviation function, and T denotes the threshold standard deviation value that identifies outlier images, said method, after applying filters, that either individually or combination, determines whether an image shall be removed from the sample, the digital filters comprising the following steps either individually or in combination:
  (i) applying the Length-width ratio filter (LW) which defines the average length-width ratio of chromosomes in an image, for a given chromosome c in a given image I containing N chromosomes, L(c,I) denotes the arc length of the centerline of c, and $W_{mean}$(c,I) denotes the mean value of the width profile of c, MW(I) is defined as the $mean\{L(c_1,I)/W_{mean}(c_1,I), \ldots, L(c_N,I)/W_{mean}(C_N,I)\}$ length-width ratio I* is removed if $MW(I^*)>mean\{MW(I1), MW(I_M)\}+T\times SD\{MW(I_1), \ldots, MW(I_M)\}$,
  (ii) applying the Centromere candidate density filter (CD) which counts occurrences of centromere candidates in images of chromosomes for a given chromosome c in a given image I containing N chromosomes, L(c,I) denotes the arc length of the centerline of c, and $N_{cent}$(c,I) denotes the number of centromere candidates of c, CD(I) is defined as the $mean\{N_{cent}(c_1,I)/L(c_1,I), \ldots, N_{cent}(c_N,I)/L(c_N,I)\}$, I* is removed if $CD(I^*)>mean\{CD(I_1), \ldots, CD(I_M)\}+T\times SD\{CD(I_1), \ldots, CD(I_M)\}$,
  (iii) applying Contour finite difference filter (FD) which represents contour smoothness of chromosomes in an image, for a given chromosome c in a given image I containing N chromosomes, $WP_D$(c,I) denotes the set of first differences of the normalized width profile of c (range normalized to interval [0,1]), WD(I) is defined as the $mean\{mean\{abs\{WPD(c_1,I)\}, \ldots, mean\{abs\{WP_D(c_N,I)\}\}\}$, I* is removed if $WD(I^*)<mean\{WD(I_1), \ldots, WD(I_M)\}-T\times SD\{WD(I_1), \ldots, WD(I_M)\}$,
  (iv) applying the Total object count (ObjCount) filter, which defines the number of all objects, O, including chromosomes and non-chromosomal objects detected in an image, I* is removed if O<40 or O>60,
  (v) applying the Segmented object count (SegObjCount) filter, which defines the number of objects processed by the gradient vector flow algorithm, $O_{GVF}$, in an image, I* is removed if $O_{GVF}$<35 or $O_{GVF}$>50,
  (vi) applying the Classified object ratio (ClassifiedRatio) filter, which defines the ratio of objects recognized as chromosomes, N, to the number of segmented objects, $O_{GVF}$, the stringency of this filter may be configured by adjusting the threshold of the acceptable minimum ratio to be either permissive (lower) or strict (higher), so that lower, I* is removed $N/O_{GVF}$<0.6 (permissive) or 0.7 (strict).

4. The method of estimation of radiation exposure by biodosimetry of claim 3, wherein said digital analysis of images of metaphase cells from the same sample, which determines a composite filter score computed from each of the filter values defined as the elements (i), (ii), (iii), (iv), (v), and (vi) of claim 3, said method further comprising the following steps: (i) combining one or more Z-scores of each of the filters for an image relative to the population of M images in a sample using the following linear expression:

Composite Filter Score=w(LW)*z(LW)+w(CD)*z (CD)−w(FD)*z(FD)+w(ObjCount)*|z(ObjCount) |+w(SegObCount)*|z(SegObjCount)|−w(ClassifiedRatio)*z(Classified Ratio)

where each of the filters, LW, CD, FD, ObjCount, SegObj Count, and ClassifiedRatio, contains a positive free parameter, weight (w) to adjust its contribution to the total score, and w is determined by evaluating and selecting values that minimize the deviation from known physical dose in a dose calibration curve,
  (ii) ranking each of the images in a sample based on the score, such that the highest scores are obtained for images exhibiting either incomplete, multiple cells or severe sister chromatid separation, or images that the automated dicentric detection algorithm does not process accurately
  (iii) and removing the images with the largest combined Z-values, which have the largest composite filter scores from the sample.

5. The method of estimation of radiation exposure levels by biodosimetry of claim 2, wherein said digital analysis of images of cells from the same sample, with each image containing chromosomes from a cell in metaphase, the sample comprising M images, $\{I_1, \ldots, I_M\}$, where $\{c_1, \ldots, c_N\}$ denote the set of N chromosomes within image I*, and SD denotes the standard deviation function, and T denotes the threshold standard deviation value that identifies outlier images, said method, after applying filters, that either individually or combination, determines whether an image shall be removed from the sample, the digital filters comprising the following steps either individually or in combination:

(i) applying the Length-width ratio filter (LW) which defines the average length-width ratio of chromosomes in an image, for a given chromosome c in a given image I containing N chromosomes, L(c,I) denotes the arc length of the centerline of c, and $W_{mean}(c,I)$ denotes the mean value of the width profile of c, MW(I) is defined as the $mean\{L(c_1,I)/W_{mean}(c_1,I), \ldots, L(c_N,I)/W_{mean}(c_N,I)\}$ length-width ratio, I* is removed if MW(I*)>mean{MW(I1), . . . , MW($I_M$)}+T×SD{MW($I_1$), . . . , MW($I_M$)}, (ii) applying the Centromere candidate density filter (CD) which counts occurrences of centromere candidates in images of chromosomes, for a given chromosome c in a given image I containing N chromosomes, L(c,I) denotes the arc length of the centerline of c, and $N_{cent}(c,I)$ denotes the number of centromere candidates of c, CD(I) is defined as the $mean\{N_{cent}(c_1,I)/L(c_1,I), \ldots, N_{cent}(c_N,I)/L(c_N,I)\}$, I* is removed if CD(I*)>mean{CD($I_1$), . . . , CD($I_M$)}+T×SD{CD($I_1$), . . . , CD($I_M$)}, (iii) applying Contour finite difference filter (FD) which represents contour smoothness of chromosomes in an image, for a given chromosome c in a given image I containing N chromosomes, $WP_D(c,I)$ denotes the set of first differences of the normalized width profile of c (range normalized to interval [0,1]), WD(I) is defined as the $mean\{mean\{abs\{WP_D(c_1,I)\}\}, \ldots, mean\{abs\{WP_D(c_N,I)\}\}\}$, I* is removed if WD(I*)<mean{WD($I_1$), . . . , WD($I_M$)}−T×SD{WD($I_1$), . . . , WD($I_M$)}, (iv) applying the Total object count (ObjCount) filter, which defines the number of all objects, O, including chromosomes and non-chromosomal objects detected in an image, I* is removed if O<40 or O>60, (v) applying the Segmented object count (SegObjCount) filter, which defines the number of objects processed by the gradient vector flow algorithm, $O_{GVF}$, in an image, I* is removed if $O_{GVF}$<35 or $O_{GVF}$>50, (vi) applying the Classified object ratio (ClassifiedRatio) filter, which defines the ratio of objects recognized as chromosomes, N, to the number of segmented objects, $O_{GVF}$, the stringency of this filter may be configured by adjusting the threshold of the acceptable minimum ratio to be either permissive (lower) or strict (higher), so that lower, I* is removed N/$O_{GVF}$<0.6 (permissive) or 0.7 (strict).

6. The method of estimation of radiation exposure levels by biodosimetry of claim 2, said method further comprising the following steps:

(i) combining one or more Z-scores of each of the filters for an image relative to the population of M images in a sample using the following linear expression:

Composite Filter Score=$w(LW)*z(LW)+w(CD)*z(CD)-w(FD)*z(FD)+w(ObjCount)*|z(ObjCount)|+w(SegObCount)*|z(SegObjCount)|-w(ClassifiedRatio)*z(ClassifiedRatio)$ where each of the filters, LW, CD, FD, Obj Count, SegObj Count, and ClassifiedRatio, contains a positive free parameter, weight (w) to adjust its contribution to the total score, and w is determined by evaluating and selecting values that minimize the deviation from known physical dose in a dose calibration curve, (ii) ranking each of the images in a sample based on the score, such that the highest scores are obtained for images exhibiting either incomplete, multiple cells or severe sister chromatid separation, or images that the automated dicentric detection algorithm does not process accurately (iii) and removing the images with the largest combined Z-values, which have the largest composite filter scores from the sample.

7. The method of estimation of radiation exposure levels by biodosimetry of claim 2, said method removing false positive dicentric chromosomes from images of metaphase cells of claim 2, and selecting metaphase images by digital analysis of images of cells from the same sample, with each image containing chromosomes from a cell in metaphase, the sample comprising M images, $\{I_1, \ldots, I_M\}$, where $\{c_1, \ldots, c_N\}$ denote the set of N chromosomes within image I*, and SD denotes the standard deviation function, and denotes the threshold standard deviation value that identifies outlier images, said method, after applying filters, that either individually or combination, determines whether an image shall be removed from the sample, the digital filters comprising the following steps either individually or in combination:

(i) applying the Length-width ratio filter (LW) which defines the average length-width ratio of chromosomes in an image, for a given chromosome c in a given image I containing N chromosomes, L(c,I) denotes the arc length of the centerline of c, and $W_{mean}(c,I)$ denotes the mean value of the width profile of c, MW(I) is defined as the $mean\{L(c_1,I)/W_{mean}(c_1,I), \ldots, L(c_N,I)/W_{mean}(c_N,I)\}$ length-width ratio, I* is removed if MW(I*)>mean{MW(I1), . . . , MW($I_M$)}+T×SD{MW($I_1$), . . . , MW($I_M$)}, (ii) applying the Centromere candidate density filter (CD) which counts occurrences of centromere candidates in images of chromosomes, for a given chromosome c in a given image I containing N chromosomes, L(c,I) denotes the arc length of the centerline of c, and $N_{cent}(c,I)$ denotes the number of centromere candidates of c, CD(I) is defined as the $mean\{N_{cent}(c_1,I)/L(c_1,I), \ldots, N_{cent}(c_N,I)/L(c_N,I)\}$, I* is removed if CD(I*)>mean{CD($I_1$), . . . , CD($I_M$)}+T×SD{CD($I_1$), . . . , CD($I_M$)}, (iii) applying Contour finite difference filter (FD) which represents contour smoothness of chromosomes in an image, for a given chromosome c in a given image I containing N chromosomes, $WP_D(c,I)$ denotes the set of first differences of the normalized width profile of c (range normalized to interval [0,1]), WD(I) is defined as the $mean\{mean\{abs\{WP_D(c_1,I)\}\}, \ldots, mean\{abs\{WP_D(c_N,I)\}\}\}$, I* is removed if WD(I*)<mean{WD($I_1$), . . . , WD($I_M$)}−T×SD{WD($I_1$), . . . , WD($I_M$)}, (iv) applying the Total object count (ObjCount) filter, which defines the number of all Objects, O, including chromosomes and non-chromosomal objects detected in an image, I* is removed if O<40 or O>60, (v) applying the Segmented object count (SegObjCount) filter, which defines the number of objects processed by the gradient vector flow algorithm, $O_{GVF}$, in an image, I* is removed if $O_{GVF}<35$ or $O_{GVF}>50$, (vi) applying the Classified object ratio (ClassifiedRatio) filter, which defines the ratio of objects recognized as chromosomes, N, to the number of segmented objects, $O_{GVF}$, the stringency of this filter may be configured by adjusting the threshold of the acceptable minimum ratio to be either permissive (lower) or strict (higher), so that lower, I* is removed $N/O_{GVF}<0.6$ (permissive) or 0.7 (strict).

8. The method of estimation of radiation exposure levels by biodosimetry in a sample from an individual of claim 2, said method removing false positive dicentric chromosomes from images of metaphase cells of claim 2, and selecting metaphase images 4 by digital analysis of images of metaphase cells from the same sample, which determines a composite filter score computed from each of the filter values, said method comprising the following steps:

(i) combining one or more Z-scores of each of the filters for an image relative to the population of M images in a sample using the following linear expression:

Composite Filter Score=$w(LW)*z(LW)+w(CD)*z(CD)-w(FD)*z(FD)+w(ObjCount)*|z(ObjCount)|+w(SegObCount)*|z(SegObjCount)|-w(ClassifiedRatio)*z(ClassifiedRatio)$ where each of the filters, LW, CD, FD, Obj Count, SegObj Count, and ClassifiedRatio, contains a positive free parameter, weight (w) to adjust its contribution to the total score, and w is determined by evaluating and selecting values that minimize the deviation from known physical dose in a dose calibration curve, (ii) ranking each of the images in a sample based on the score, such that the highest scores are obtained for images exhibiting either incomplete, multiple cells or severe sister chromatid separation, or images that the automated dicentric detection algorithm does not process accurately (iii) and removing the images with the largest combined Z-values, which have the largest composite filter scores from the sample.

9. The method of estimation of radiation exposure levels by biodosimetry in a sample from an individual of claim 2, said method wherein false positive dicentric chromosomes from images of metaphase cells of claim 2 are removed at said eliminating the set of selected digital images of false positive dicentric chromosomes step of claim 1.

10. The method of estimation of radiation exposure levels by biodosimetry in a sample from an individual of claim 3, said method selecting metaphase images according to claim 3.

11. The method of estimation of radiation exposure levels by biodosimetry in a sample from an individual of claim 4, said method selecting metaphase images according to claim 4, said method selecting metaphase images according to claim 4, further comprising any or all of the following steps:

(i) reducing the size of a confidence interval of the estimated exposure, wherein the size of the reduced confidence interval is less than the interval computed from the unselected set of metaphase images, (ii) reducing the dose estimation error to within 0.5 Gy of the corresponding physical radiation dose, (iii) demonstrating that dicentric chromosome counts among a set of selected metaphase images from the same sample are Poisson distributed thereby improving the quality of image data of said selected metaphase images.

12. The method of estimation of radiation exposure levels by biodosimetry of claim 1, wherein the automatic selection of digital images obtained from metaphase cells from a sample isolated from an individual is performed by ranking images with a score computed from the known lengths of chromosomes, which are proportionate to the known base-pair counts of each complete chromosome, whereby the quality of a metaphase cell image is determined by comparing distribution of observed chromosome object lengths with the expected distribution of lengths obtained from relative known base-pair counts of chromosome in the reference human genome sequence, as follows:

(i) the individual chromosome lengths in each image are approximated according to their corresponding chromosome areas in pixels, (ii) a fractional area of each chromosome relative to the total area of all chromosomes is determined, (iii) the chromosomes are binned according to base-pair lengths into categories corresponding to grouping defined by the International System of Cytogenetic Nomenclature, namely (1) groups A and B, which contain >2.9% of the DNA, (2) group C, which contains between 2 and 2.9% of DNA, and (3) groups D, E, F, and G, which contain <2% of the DNA (4) X chromosome, which contains approximately 2.9% of the DNA, and (5) Y chromosome which contains approximately 2% of the DNA, of the total base-pairs in a complete chromosome set, (iv) the thresholds in (iii) are compared to the fractional area of each chromosome in the metaphase image, accounting for the correct length of the sex chromosomes by reference to the known sex of the individual from whom the sample was obtained, by categorizing the result for each of the three bins in an image as a 3-element vector, and calculating a Euclidean distance from the vector to an idealized vector based on the reference human chromosome lengths, (v) sorting and ranking these Euclidean distances for all images in a sample, (vi) and eliminating images from a sample with the largest Euclidean distances, which exhibit the lowest similarity to the chromosome length distributions in a normal karyotype.

13. The method of estimation of radiation exposure levels by biodosimetry in a sample of an individual of claim 3, said method further comprising at least one of steps (i)—(iii) below (i) reducing the size of a confidence interval of the estimated exposure wherein the size of the reduced confidence interval is less than the interval computed from the unselected set of metaphase images, (ii) reducing the dose estimation error to within 0.5 Gy of the corresponding physical radiation dose, (iii) demonstrating that dicentric chromosome counts among a set of selected metaphase images from the same sample are Poisson distributed, thereby improving the quality of image data of said selected metaphase images of claim 3.

14. The method of estimation of radiation exposure levels by biodosimetry in a sample of an individual of claim 2, said method further comprising at least one of steps (i)—(iii) below, (i) reducing the size of a confidence interval of the estimated exposure, wherein the size of the reduced confidence interval is less than the interval computed from the unselected set of metaphase images, (ii) reducing the dose estimation error to within 0.5 Gy of the corresponding physical radiation dose,
(iii) demonstrating that dicentric chromosome counts among a set of selected metaphase images from the same sample are Poisson distributed thereby improving the quality of image data of said selected metaphase images.

15. The method of estimation of radiation exposure levels by biodosimetry of claim 14, further comprising:
    (i) determining an observed distribution of dicentric chromosomes in all of the cell images in the sample according to the number of cells containing dicentric chromosomes, where i=0 or an integer >0,
    (ii) estimating an expected distribution of dicentric chromosomes from a Poisson distribution, with the $\lambda$ parameter of the distribution set to the average number of dicentric chromosomes per cell in all of the cell images in the sample,
    (iii) computing a Pearson Chi-squared goodness of fit statistic based on the observed and expected dicentric chromosome distributions for i-1 degrees of freedom and $\alpha=0.01$,
    (iv) performing steps (i), (ii), and (iii) for the set of images in the sample after removal of the low quality images,
    (v) determining if the sample null hypothesis that the dicentric chromosomes in the sample follow a Poisson distribution is rejected for the complete set of images and accepted for the sample wherein low quality images have been removed.

16. The method of estimation of radiation exposure levels by biodosimetryof claim 14, said method further comprising:
    (i) selection of a set of samples of known radiation doses, each consisting of a set of metaphase cell images,
    (iii) assignment of a support vector machine sigma value for dicentric chromosome detection,
    (iv) assignment of a maximum number of images to be ranked,
    (iv) assignment of a range of parameter values spanning the search space of all possible image selection models that are evaluated and compared to determine the accuracy of each combination of parameters,
    (v) evaluation of one or more parameter combinations either by selecting the model with the highest p-values of Poisson fit of dicentric chromosome distribution (p>0.05) for all samples in the set, or by selecting an optimal dose calibration curve from the sample set in (i) by minimizing the residual deviations from the known radiation dose, or by performing a leave-one cross-validation of the estimated dose for each of the samples in (i),
    (vi) presents an optimal automated selection models found during the search sorted according to the overall accuracy of dose estimation determined from the root mean squared sum of differences between the estimated and physical radiation doses over all samples in the set.

17. The method of claim 1 for computing the radiation exposure of a sample, said method used to estimate either whole body or partial body exposures.

* * * * *